United States Patent
Ying et al.

(10) Patent No.: US 12,200,741 B2
(45) Date of Patent: Jan. 14, 2025

(54) DATA PROCESSING METHOD AND APPARATUS, AND SYSTEM

(71) Applicant: HUAWEI TECHNOLOGIES CO., LTD., Shenzhen (CN)

(72) Inventors: Jiangwei Ying, Beijing (CN); Meng Li, Beijing (CN); Xiao Xiao, Shenzhen (CN); Yanmei Yang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 494 days.

(21) Appl. No.: 17/531,050

(22) Filed: Nov. 19, 2021

(65) Prior Publication Data

US 2022/0078795 A1    Mar. 10, 2022

Related U.S. Application Data

(63) Continuation of application No. PCT/CN2020/070836, filed on Jan. 8, 2020.

(30) Foreign Application Priority Data

May 22, 2019 (CN) .......................... 201910429860.X

(51) Int. Cl.
*H04W 72/53* (2023.01)
*H04W 4/40* (2018.01)
*H04W 76/10* (2018.01)

(52) U.S. Cl.
CPC ............. *H04W 72/53* (2023.01); *H04W 4/40* (2018.02); *H04W 76/10* (2018.02)

(58) Field of Classification Search
None
See application file for complete search history.

(56) References Cited

U.S. PATENT DOCUMENTS

| | | | | |
|---|---|---|---|---|
| 10,798,764 | B2* | 10/2020 | Fu | H04W 28/0257 |
| 11,357,064 | B2* | 6/2022 | Pan | H04W 72/51 |
| 2020/0092685 | A1* | 3/2020 | Fehrenbach | H04W 76/27 |
| 2020/0112841 | A1* | 4/2020 | Kim | H04W 4/46 |

FOREIGN PATENT DOCUMENTS

| | | | |
|---|---|---|---|
| CN | 107889255 A | 4/2018 | |
| CN | 108702722 A | 10/2018 | |
| CN | 109787799 A | 5/2019 | |

(Continued)

OTHER PUBLICATIONS

General Dynamics Broadband UK, A hybrid approach to ProSe Group communication and UE-to-Network relays. SA WG2 Meeting #99, Sep. 23-27, 2013, Xiamen, P.R. China, S2-133389, 6 pages.

(Continued)

*Primary Examiner* — Hong S Cho
(74) *Attorney, Agent, or Firm* — HAUPTMAN HAM, LLP

(57) ABSTRACT

A data processing method includes receiving by an access network device a vehicle-to-everything (V2X) communication parameter of a group member device. The method also includes storing, by the access network device, the V2X communication parameter with context about a group to which the group member device belongs. The V2X communication parameter is used for allocation of a ProSe communication 5 (PC5) resource to the group member device.

18 Claims, 16 Drawing Sheets

(56) References Cited

FOREIGN PATENT DOCUMENTS

| | | | |
|---|---|---|---|
| CN | 110366132 A | 10/2019 | |
| WO | 2018182603 A1 | 10/2018 | |
| WO | 2018202797 A1 | 11/2018 | |
| WO | 2018202798 A1 | 11/2018 | |

OTHER PUBLICATIONS

3GPP TR 23.786 V16.0.0 (Mar. 2019), 3rd Generation Partnership Project; Technical Specification Group Services and System Aspects; Study on architecture enhancements for the Evolved Packet System (EPS) and the 5G System (5GS) to support advanced V2X services(Release 16), 118 pages.
Huawei, Hisilicon, Proposal for solution to key issue on V2X dynamic groups. 3GPP TSG-SA WG6 Meeting #25, Sophia Antipolis, France, Jul. 23-27, 2018, S6-181166, 4 pages.
3GPP TS 23.287 V0.3.0 (Apr. 2019), 3rd Generation Partnership Project; Technical Specification Group Services and System Aspects; Architecture enhancements for 5G System (5GS) to support Vehicle-to-Everything (V2X) services (Release 16), 39 pages.
International Search Report issued in corresponding International Application No. PCT/CN2020/070836, dated Mar. 26, 2020, pp. 1-10.
Chinese Office Action issued in corresponding Chinese Application No. 201910429860.X, dated Apr. 26, 2021, pp. 1-11.
Samsung, SK Telecom, New solution for KI#5 and KI#11 (Nnef_UEProvisioning Service). SA WG2 Meeting #129, Oct. 15-19, 2018, Dongguan, China, S2-1810339, 6 pages.
European Search Report issued in corresponding European Application No. 20808811.2, dated May 24, 2022, pp. 1-11.

\* cited by examiner

DATA PROCESSING METHOD AND APPARATUS, AND SYSTEM

CROSS-REFERENCE TO RELATED APPLICATIONS

This application is a continuation of International Application No. PCT/CN2020/070836, filed on Jan. 8, 2020, which claims priority to Chinese Patent Application No. 201910429860.X, filed on May 22, 2019. The disclosures of the aforementioned applications are hereby incorporated by reference in their entireties.

TECHNICAL FIELD

This application relates to the communication field, and in particular, to a data processing method, apparatus and system.

BACKGROUND

Upgrade of mobile communication technologies will undoubtedly bring numerous innovative applications to various industries. Mobile broadband, multimedia, machine type communication (MTC), industrial control, intelligent transportation systems (ITSs), and the like will become main use cases in the 5G era. Vehicle-to-everything (V2X) communication includes ProSe communication 5 (PC5) communication or Uu communication.

In a group communication scenario such as in a mode 2 communication mode of the PC5 communication, a communication group may include two or more user equipments (UEs). At least one user equipment is used as a group control device, and at least one other user equipment is a group member device. A group member does not directly request a resource from a radio access network (RAN), but the group control device requests a PC5 resource for PC5 communication of the group member device from a corresponding access network device.

However, in an existing solution, the access network device cannot determine whether the group member device can be authorized. Consequently, the access network device may refuse to allocate the PC5 resource to the group member device, and therefore, the group member device cannot perform PC5 communication.

SUMMARY

This application provides a data processing method, apparatus and system, to enable, in group communication, an access network device to store a V2X communication parameter of a group member device for a group control device and successfully allocate a PC5 resource to the group member device based on the stored V2X communication parameter, so that the group member device can perform communication of a V2X service on the allocated PC5 resource.

In view of this, a first aspect provides a data processing method, including:

an access network device that receives a vehicle-to-everything V2X communication parameter of a group member device. The access network device stores the V2X communication parameter along with context indicating a group to which the group member device belongs, where the V2X communication parameter is used for allocating a ProSe communication 5 (PC5) resource to the group member device. In an embodiment, the access network device may receive the V2X communication parameter and store the V2X communication parameter for the group control device, where the V2X communication parameter may be used to subsequently allocate the PC5 resource to the group member device. The access network device may allocate the PC5 resource to the group member device based on the vehicle-to-everything (V2X) communication parameter of the group member device, so that the group member device can perform normal communication of a V2X service on the allocated PC5 resource.

In an embodiment, the method further includes:

the access network device allocates the PC5 resource to the group member device based on the V2X communication parameter, and the access network device sends information about the PC5 resource to the group control device. In an embodiment, the access network device may allocate the PC5 resource to the group member device based on the stored V2X communication parameter of the group member device, so that the access network device can allocate the PC5 resource to the group member device.

In an embodiment, an access network device receives a vehicle-to-everything V2X communication parameter of a group member device that includes:

a V2X communication parameter from a PCF entity. In an embodiment, the V2X communication parameter may be sent by the PCF entity, so that the access network device receives the correct V2X communication parameter and stores the V2X communication parameter. Subsequently, the access network device may allocate the PC5 resource to the group member device based on the stored V2X communication parameter.

In an embodiment, an access network device receives a vehicle-to-everything V2X communication parameter of a group member device that includes:

a V2X communication parameter from the group control device. In an embodiment, the access network device may receive the V2X communication parameter from the group control device, and a PCF entity does not send the V2X communication parameter. This improves efficiency of obtaining the V2X communication parameter of the group member device by the access network device.

In an embodiment, after the access network device receives the V2X communication parameter from the group control device, the method further includes: sending a verification information to the PCF entity, where the verification information is used to verify the V2X communication parameter. The access network device receives verification reply information from the PCF entity. The access network device stores the V2X communication parameter for the group control device that includes: a verification reply information used to indicate that the V2X communication parameter is successfully verified, the access network device stores the V2X communication parameter. In an embodiment, if the V2X communication parameter is sent by the group control device, the access network device may request the PCF entity to verify the V2X communication parameter, so that the access network device can store the correct V2X communication parameter. In addition, after verifying the V2X communication parameter, the PCF entity returns the verification reply information and does not send the V2X communication parameter. This reduces signaling overheads of the PCF entity.

In an embodiment, the verification information includes the V2X communication parameter and an identifier of the group member device. In an embodiment, the verification information may carry the V2X communication parameter, so that the PCF entity may compare, for verification, the V2X communication parameter with a correct V2X communication parameter obtained by the PCF entity.

In an embodiment, the method further includes:
the access network device sending an indication information of the group control device to the PCF entity, where the indication information is used to indicate that a connection has been established between the group member device and the group control device. In an embodiment, the access network device may further send the indication information of the group control device to the PCF entity, to notify the PCF entity that the connection has been established between the group member device and the group control device.

In an embodiment, the access network device receives the V2X communication parameter from the group control device that includes:
a radio resource control (RRC) message from the group control device, where the RRC message includes the V2X communication parameter. In an embodiment, the group control device may send the V2X communication parameter of the group member device to the access network device by using the RRC message, so that the access network device may store the V2X communication parameter, and may allocate the PC5 resource to the group member device based on the V2X communication parameter.

In an embodiment, before the access network device allocates the PC5 resource to the group member device based on the V2X communication parameter, the access network device receives a PC5 resource request message from the group control device, where the PC5 resource request message is used to request to allocate the PC5 resource to the group member device. The access network device allocates the PC5 resource to the group member device based on the V2X communication parameter that includes: an allocation of the PC5 resource to the group member device based on the PC5 resource request message and the V2X communication parameter. In an embodiment, after the access network device stores the V2X communication parameter of the group member device in the context of the group control device, the access network device may allocate the PC5 resource to the group member device based on the stored V2X communication parameter, so that the group member device can perform communication of the V2X service on the allocated PC5 resource.

In an embodiment, the access network device allocates the PC5 resource to the group member device based on the PC5 resource request message and the V2X communication parameter that includes:
an authorization check on the group member device based on the V2X communication parameter. Based on a determination that the group member device is successfully authorized, the access network device allocates the PC5 resource to the group member device; and the access network device sends, to the group control device, the information about the PC5 resource allocated to the group member device. In an embodiment, after receiving the PC5 resource request message from the group control device, the access network device determines the group member device to which the group control device requests allocation of the PC5 resource; performs an authorization check based on the V2X communication parameter stored in the context of the group control device, to determine whether the group member device can use the PC5 resource; and allocates the PC5 resource to the group member device based on the determination that the group member device is successfully authorized. The group member device may perform communication of the V2X service on the allocated PC5 resource.

In an embodiment, the PC5 resource request message includes at least one of a group member identification number of the group member device, a PC5 quality of service identifier (PQI) of the group member device, a PC5 quality of service (QoS) flow identifier of the group member device, or a data volume of the group member device. In an embodiment, the group member identification number may be used by the access network device to identify the group member device, the PQI may be used by the access network device to identify a quality of service class of the group member device, the PC5 QoS flow identifier may be used by the access network device to identify a QoS flow of the group member device, and the data volume may be used by the access network device to learn of a volume of data transmitted by the group member device. Therefore, the access network device may allocate the PC5 resource to the group member device based on the PC5 resource request message and the stored V2X communication parameter.

In an embodiment, before the access network device receives the PC5 resource request message from the group control device, the method further includes: receiving the group member identification number of the group member device. In an embodiment, the access network device may further receive the group member identification number of the group member device, and the group member identification number may be used when the group control device requests the PC5 resource for the group member device, so that the group control device, the access network device, or the like can identify the group member device based on the group member identification number.

In an embodiment, before the access network device receives the PC5 resource request message from the group control device, the method further includes:
allocating, by the access network device, the group member identification number to the group member device, and the sending the group member identification number to the group control device. In an embodiment, the group member identification number may be allocated by the access network device and notified to the group control device, so that the group control device may request the PC5 resource for the group member device based on the group member identification number allocated by the access network device.

In an embodiment, the V2X communication parameter includes at least one of the following: a V2X authorization information of the group member device or a PC5 quality of service QoS parameter of the group member device. In an embodiment, the V2X authorization information may be used to determine whether the group member device can use the PC5 resource, and the PC5 quality of service QoS parameter may be used to indicate a quality-of-service class of the PC5 resource that can be used by the group member device. Therefore, the access network device may subsequently allocate the PC5 resource to the group member device based on the stored V2X communication parameter.

A second aspect provides a data processing method, including:
a PCF entity obtaining a V2X communication parameter of a group member device, and the PCF entity sending the V2X communication parameter to an access network device accessed by a group control device in a group to which the group member device belongs.

In an embodiment, the PCF entity may obtain the V2X communication parameter of the group member device, and send the V2X communication parameter to the access network device accessed by the group control device The access network device may store the V2X communication parameter in a context of the group control device, so that the access network device may allocate a PC5 resource to the group member device based on the stored V2X communication parameter of the group member device.

In an embodiment, before the PCF entity obtains the V2X communication parameter of the group member device, the method further includes: receiving an indication information from the PCF entity, where the indication information is used to indicate that a connection has been established between the group member device and the group control device. The PCF entity obtains a V2X communication parameter of a group member device that includes: the V2X communication parameter of the group member device based on the indication information. In an embodiment, the PCF entity may obtain the V2X communication parameter of the group member device based on the indication information, where the indication information may trigger the PCF entity to obtain the V2X communication parameter of the group member device, and is used as a basis for the PCF entity to obtain the V2X communication parameter of the group member device.

In an embodiment, the PCF entity obtains the V2X communication parameter of the group member device based on the indication information that includes:

a locally stored V2X communication parameter based on the indication information, or the V2X communication parameter from a unified data repository (UDR) network element based on the indication information. In an embodiment, after receiving the indication information, the PCF entity may obtain the V2X communication parameter of the group member device from the UDR based on the indication information, so that the access network device can receive the reliable V2X communication parameter stored in the UDR.

In an embodiment, the PCF entity receives indication information that includes:

an indication information from an application server (AS); the PCF entity receives the indication information from the group control device; the indication information from the group member device; or the indication information from the access network device. In an embodiment, the PCF entity may receive the indication information in a plurality of manners, and obtain the V2X communication parameter of the group member device based on the indication information. A person of skill in the art may understand that the indication information may trigger the PCF entity to obtain the V2X communication parameter of the group member device and then send the V2X communication parameter of the group member device to the access network device, so that the access network device stores the V2X communication parameter of the group member device. The access network device may subsequently allocate the PC5 resource to the group member device based on the stored V2X communication parameter of the group member device, to avoid blind PC5 resource allocation.

In an embodiment, the method further includes:

an authorization check by the PCF entity on the group member device based on the V2X communication parameter. Based on a determination that the group member device is successfully authorized, the PCF entity associates the group member device with the group control device.

In an embodiment, the PCF entity may perform an authorization check on the group member device based on the obtained V2X communication parameter. Based on a determination that the group member device is successfully authorized, the PCF entity may associate the group member device with the group control device, so that the PCF entity may store a connection relationship between the group member device and the group control device.

In an embodiment, the method further includes:

sending, via the PCF entity, the V2X communication parameter to the group control device, so that the group control device stores the V2X communication parameter. In an embodiment, after storing the V2X communication parameter, the group control device may perform authorization check on the group member device based on the stored V2X communication parameter, and the access network device may not perform authorization check. This can reduce workload of the access network device and improve work efficiency of the access network device.

In an embodiment, the method further includes:

receiving, via the PCF entity, a group member identification number of the group member device from the group control device; receiving, via the PCF entity, a group member identification number of the group member device from the group member device; or allocating, via the PCF entity, a group member identification number to the group member device. In an embodiment, the PCF entity may obtain the group member identification number in a plurality of manners and may subsequently identify the group member device based on the group member identification number.

In an embodiment, the method further includes: sending via the PCF entity the group member identification number to the access network device. In an embodiment, the PCF entity may further send the group member identification number to the access network device, so that the access network device can identify, based on the group member identification number, the group member device to which the PC5 resource is to be allocated.

In an embodiment, after the PCF entity allocates the group member identification number to the group member device, the method further includes: sending via the PCF entity the group member identification number to the group member device; sending via the PCF entity, the group member identification number to the group control device; or sending, via the PCF entity, the group member identification number to the AS. In an embodiment, the PCF entity may allocate the group member identification number to the group member device, and send the group member identification number to the group member device, the group control device, the AS, or the like, so that the group member device, the group control device, the AS, or the like can identify the group member device based on the group member identification number.

In an embodiment, the V2X communication parameter includes at least one of the following: a V2X authorization information or a PC5 quality of service QoS parameter of the group member device. In an embodiment, the V2X authorization information may be used to determine whether the group member device can use the PC5 resource, and the PC5 quality of service QoS parameter may be used to indicate a class of the PC5 resource that can be used by the group member device. Therefore, the access network device may subsequently allocate the PC5 resource to the group member device based on the stored V2X communication parameter.

In an embodiment, if the V2X communication parameter of the group member device is sent by the group control device to the access network device, the PCF entity receives verification information from the access network device, where the verification information is used to verify the V2X communication parameter of the group member device. The PCF entity sends a request message to the UDR based on the verification information, where the request message is used to request a V2X communication parameter. The PCF entity receives the V2X communication parameter of the group member device from the unified data repository UDR network element. In an embodiment, if the group control device sends the V2X communication parameter of the group member device to the access network device, the PCF entity may verify the V2X communication parameter, to determine that the access network device has stored the correct V2X communication parameter.

In an embodiment, based on a determination that the PCF entity successfully verifies the V2X communication parameter of the group member device, the PCF entity may generate verification reply information, where the verification reply information indicates that the V2X communication parameter is successfully verified. The PCF entity sends the verification reply information to the access network device, to notify the access network device that the V2X communication parameter is successfully verified, so that the access network device can store the correct V2X communication parameter of the group member device.

A third aspect provides a data processing method, including:
establishing, via a group control device, a connection to a group member device. The group control device sends indication information to a PCF entity, where the indication information is used to indicate that the connection has been established between the group control device and the group member device.

In an embodiment, the connection may be established between the group control device and the group member device, and then the group control device sends the indication information to the PCF entity, to notify the PCF entity that the connection has been established between the group control device and the group member device. Then, the PCF entity may obtain a V2X communication parameter of the group member device based on the indication information and send the V2X communication parameter to an access network device, so that the access network device stores the V2X communication parameter of the group member device with context innating a group the group control device belongs to, and may further allocate a PC5 resource to the group member device based on the stored V2X communication parameter.

In an embodiment, that the group control device sends indication information to a PCF entity that includes:
an indication information to the PCF via an application server AS. In an embodiment, the group control device may send the indication information to the PCF entity via the AS, so that a manner of sending the indication information is provided.

In an embodiment, the method further includes:
receiving, via the group control device, a PC5 resource request message from the group member device. The group control device sends the PC5 resource request message to the access network device. The group control device receives, from the access network device, information about the PC5 resource allocated to the group member device. The group control device allocates the PC5 resource to the group member device based on the information about the PC5 resource. In an embodiment, after receiving the PC5 resource request message of the group member device, the group control device may request the access network device to allocate the PC5 resource to the group member device. The access network device may allocate the PC5 resource to the group member device based on the stored V2X communication parameter. Therefore, the group member device may perform a V2X service on the allocated PC5 resource.

In an embodiment, the method further includes:
receiving the V2X communication parameter from the PCF entity, and storing the V2X communication parameter. In an embodiment, the PCF entity further sends the V2X communication parameter of the group member device to the group control device, so that the group control device performs authorization check. This reduces workload of the access network device.

In an embodiment, the group control device sends, to the access network device, the PC5 resource request message corresponding to the group member device that includes:
based on a determination via the group control device, that the group member device is successfully authorized based on the V2X communication parameter of the group member device, the group control device sends the PC5 resource request message to the access network device. In an embodiment, the group control device sends the PC5 resource request message to the access network device after determining that the group member device is authorized, so that workload of the access network device can be reduced. Based on the determination that the group member device is not authorized, the PC5 resource request message may not be sent, thereby reducing signaling overheads of the group control device.

In an embodiment, the method further includes:
sending, via the group control device, a group member identification number to the group member device. In an embodiment, the group member identification number may be used by the group member device to request the PC5 resource.

In an embodiment, before the group control device sends the group member identification number to the group member device, the method further includes:
allocating, via the group control device, the group member identification number to the group member device;
receiving, via the group control device, the group member identification number from the PCF entity; or
receiving, via the group control device, the group member identification number from the access network device. In an embodiment, the group member identification number may be obtained in a plurality of manners.

In an embodiment, the V2X communication parameter includes at least one of the following: a V2X authorization information or a PC5 quality of service QoS parameter of the group member device.

A fourth aspect provides a data processing method, including:
receiving, via a group control device a V2X communication parameter from a group member device and sends the V2X communication parameter to an access network device. In an embodiment, after receiving the V2X communication parameter from the group member device, the group control device sends the V2X communication parameter to the access network device. In this way, the access network device may store the V2X communication parameter of the group member device and allocate a PC5 resource to the group member device based on the V2X communication parameter.

In an embodiment, the method further includes:

receiving, via the group control device, a PC5 resource request message from the group member device. The sending, via the group control device, the PC5 resource request message to the access network device. Receiving, via the group control device, information about the PC5 resource allocated to the group member device from the access network device. The group control device allocates the PC5 resource to the group member device based on the information about the PC5 resource. In an embodiment, after receiving the PC5 resource request message of the group member device, the group control device may request the access network device to allocate the PC5 resource to the group member device. The access network device may allocate the PC5 resource to the group member device based on the stored V2X communication parameter. Therefore, the group member device may perform communication of a V2X service on the allocated PC5 resource.

In an embodiment, the group control device sends the PC5 resource request message to the access network device that includes:

based on a determination that the group member device is successfully authorized based on the V2X communication parameter of the group member device and the PC5 resource request message, the group control device sends the PC5 resource request message to the access network device. In an embodiment, the group control device performs authorization check. This reduces workload of the access network device. The group control device sends the PC5 resource request message to the access network device after determining that the group member device is successfully authorized, so that workload of the access network device can be reduced. Based on a determination that the group member device is not authorized, the PC5 resource request message may not be sent, thereby reducing signaling overheads.

In an embodiment, the method further includes:

sending, via the group control device, a group member identification number to the group member device, where the group member identification number may be used by the group member device to request the PC5 resource.

In an embodiment, before the group control device sends the group member identification number to the group member device, the method further includes:

allocating, via the group control device, the group member identification number to the group member device; receiving, via the group control divide, the group member identification number from a PCF entity; or receiving, via the group control device, the group member identification number from the access network device. In an embodiment, the group member identification number may be obtained in a plurality of manners.

In an embodiment, the V2X communication parameter includes at least one of the following: a V2X authorization information or a PC5 quality of service QoS parameter of the group member device.

A fifth aspect provides a data processing apparatus. The data processing apparatus has a function of implementing the data processing method in the first aspect. The function may be implemented by hardware or may be implemented by hardware executing corresponding software. The hardware or the software includes one or more modules corresponding to the function.

A sixth aspect provides a data processing apparatus. The data processing apparatus has a function of implementing the data processing method in the second aspect. The function may be implemented by hardware or may be implemented by hardware executing corresponding software. The hardware or the software includes one or more modules corresponding to the function.

A seventh aspect provides a data processing apparatus. The data processing apparatus has a function of implementing the data processing method in the third aspect. The function may be implemented by hardware or may be implemented by hardware executing corresponding software. The hardware or the software includes one or more modules corresponding to the function.

An eighth aspect provides a data processing apparatus. The data processing apparatus has a function of implementing the data processing method in the fourth aspect. The function may be implemented by hardware or may be implemented by hardware executing corresponding software. The hardware or the software includes one or more modules corresponding to the function.

A ninth aspect provides a data processing apparatus. The data processing apparatus may include:

a processor, a memory, and an input/output interface, where the processor and the memory are connected to the input/output interface; the memory is configured to store program code; and when invoking the program code in the memory, the processor performs the step in the method according to any one of the first aspect or the embodiments of the first aspect.

A tenth aspect of the embodiments provides a data processing apparatus. The data processing apparatus may include:

a processor, a memory, and an input/output interface, where the processor and the memory are connected to the input/output interface; the memory is configured to store program code; and when invoking the program code in the memory, the processor performs the step in the method according to any one of the second aspect or the embodiments of the second aspect.

An eleventh aspect of the embodiments provides a data processing apparatus. The data processing apparatus may include:

a processor, a memory, and an input/output interface, where the processor and the memory are connected to the input/output interface; the memory is configured to store program code; and when invoking the program code in the memory, the processor performs the step in the method according to any one of the third aspect or the embodiments of the third aspect.

A twelfth aspect of the embodiments provides a data processing apparatus. The data processing apparatus may include:

a processor, a memory, and an input/output interface, where the processor and the memory are connected to the input/output interface; the memory is configured to store program code; and when invoking the program code in the memory, the processor performs the step in the method according to any one of the fourth aspect or the embodiments of the fourth aspect.

A thirteenth aspect of the embodiments provides a data processing apparatus. The data processing apparatus may be used in a device, for example, a PCF entity, an access network device, or a group control device. The data processing apparatus is coupled to a memory and is configured to read and execute instructions stored in the memory, so that the data processing apparatus implements the step in the method according to any embodiment of any one of the first aspect to the fourth aspect. In an embodiment, the data processing apparatus is a chip or a system-on-a-chip.

A fourteenth aspect provides a chip system. The chip system includes a processor, configured to support a PCF entity, an access network device, or a group control device in implementing functions in the foregoing aspects, for example, processing data and/or information in the foregoing methods. In an embodiment, the chip system further includes a memory, where the memory is configured to store program instructions and data for the PCF entity, the access network device, or the group control device. The chip system may include a chip or may include a chip and another discrete component.

The processor mentioned anywhere above may be a general-purpose central processing unit (CPU), a microprocessor, an application-specific integrated circuit (ASIC), or one or more integrated circuits for controlling program execution of the data processing method in the first aspect.

A fifteenth aspect of the embodiments provides a storage medium. It should be noted that technical solutions of the present invention essentially, or the part contributing to the prior art, or all or a part of the technical solutions may be implemented in a form of a software product. The computer software product is stored in the storage medium and is configured to store computer software instructions used by the foregoing device. The computer software instructions include a program designed for a data processing apparatus, for example, a PCF entity, an access network device, or a group control device, to perform any embodiment of any one of the first aspect to the fourth aspect.

The storage medium includes various media that may store program code, such as a USB flash drive, a removable hard disk, a read-only memory (ROM), a random-access memory (RAM), a magnetic disk, or an optical disc.

A sixteenth aspect of the embodiments provides a computer program product including instructions. When the computer program product is run on a computer, the computer is enabled to perform the method according to any embodiment of any one of the first aspect to the fourth aspect.

A seventeenth aspect of the embodiments provides a communication system. The communication system includes a PCF entity, an access network device, and a group control device.

The access network device may include the data processing apparatus provided in the fifth aspect.

The PCF entity may include the data processing apparatus provided in the sixth aspect.

The group control device may include the data processing apparatus provided in the seventh aspect or the eighth aspect.

In the embodiments, the access network device may receive the V2X communication parameter and store the V2X communication parameter for the group control device, where the V2X communication parameter may be used to subsequently allocate the PC5 resource to the group member device. The access network device may allocate the PC5 resource to the group member device based on the V2X communication parameter of the group member device, so that the group member device can perform normal communication on the allocated PC5 resource.

DESCRIPTION OF EMBODIMENTS

This application provides a data processing method, apparatus and a system, to enable, in group communication, an access network device to store a V2X communication parameter of a group member device for a group control device and successfully allocate a PC5 resource to the group member device based on the stored V2X communication parameter, so that the group member device can perform communication of a V2X service on the allocated PC5 resource.

First, the data processing method provided in embodiments may be applied to various communication systems such as a 5G communication system. The following uses the 5G communication system as an example to describe an application scenario of the data processing method provided in the embodiments.

Figure 1:
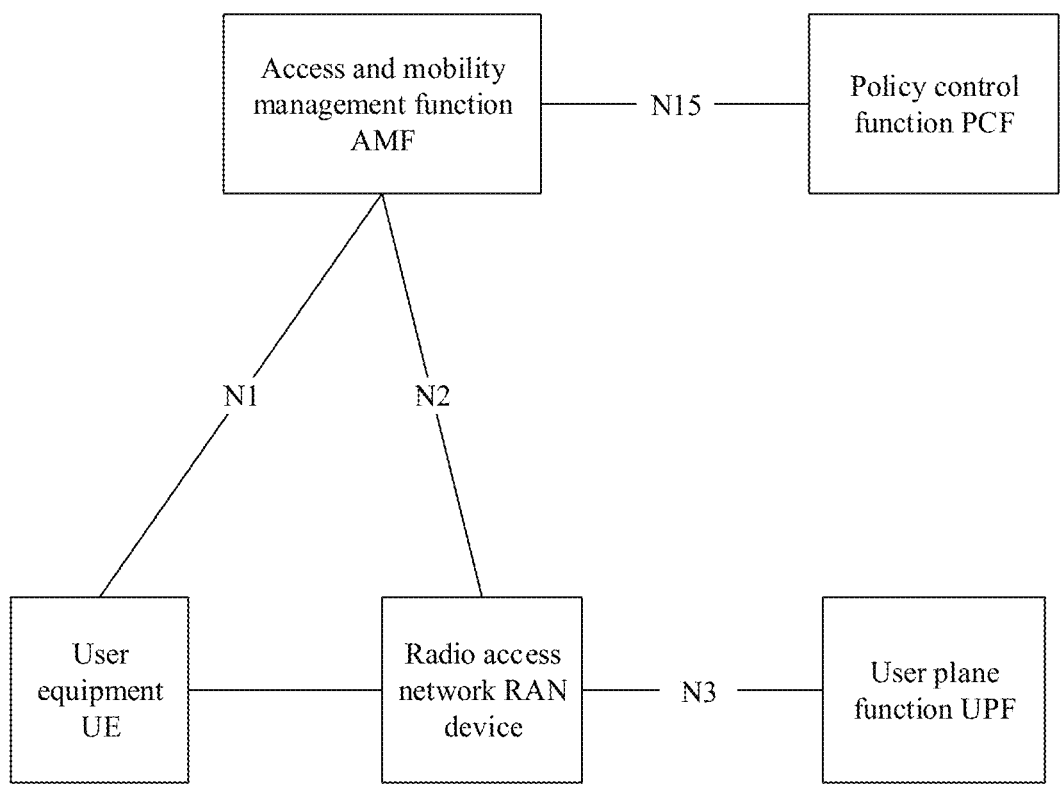
FIG. 1 is a schematic diagram of a network architecture to which a data processing method according to this application is applied.

For example, a network architecture to which the data processing method provided in this application is applied may be shown in FIG. 1. FIG. 1 shows a 3rd generation partnership project (3GPP) network architecture based on a 5G communication technology.

The network architecture may include but is not limited to including a radio access network (RAN) device, an AMF entity, a user plane function (UPF) entity, a PCF entity, user equipment (UE), and the like. In addition, quantities of the network elements or devices may each be one or more, and the quantity being one is merely used in FIG. 1 as an example for description.

The AMF entity is responsible for functions such as authentication of a terminal device, mobility management of the terminal device, network slice selection, and selection of a session management function (SMF) entity.

The PCF entity is responsible for providing a policy rule to a network entity.

ARAN may be a network including a plurality of RAN devices, and implement a radio physical layer function, resource scheduling and radio resource management, radio access control, a mobility management function, and the like. The RAN device is connected to the UPF entity through a user plane interface N3, to transmit data of the terminal device. The RAN device establishes a control plane signaling connection to the AMF entity through a control plane interface N2, to implement functions such as radio access bearer control. The radio access network device, namely, the RAN device, shown in FIG. 1 in this application may alternatively be replaced with a wired access network device. In FIG. 1, the RAN device is merely used as an example for description and is directly referred to as an access network device in the following descriptions. The access network device may be a device having a central control function, for example, may be a macro base station, a micro base station, a pico, a femeto, a transmission point (TP), a relay, or an access point (AP). If the access network device is a base station, the base station may be an eNodeB (eNB) in long term evolution (long term evolution, LTE) a gNodeB (gNB) in new radio (NR), or the like.

The UE is configured to provide a user with voice/data connectivity, and for example, is a handheld device with a wireless connection function or a vehicle-mounted device. Alternatively, the UE may include an intelligent mobile phone, a mobile station (MS), a mobile terminal (MT), or the like. The UE may also be referred to as a terminal device below.

The UPF entity serves as an anchor point of a protocol data unit (protocol data unit, PDU) session connection, and is responsible for data packet filtering, data transmission/forwarding, rate control, charging information generation, and the like of the user equipment.

In addition, the network architecture may further include another network element (not shown in FIG. 1) in addition to the network elements included in FIG. 1, for example, may further include an authentication server function (AUSF), a network slice selection function (NSSF), and a session management function (SMF). This is merely an example for description in an embodiment of this application and may be adjusted based on an actual application scenario.

Figure 2:
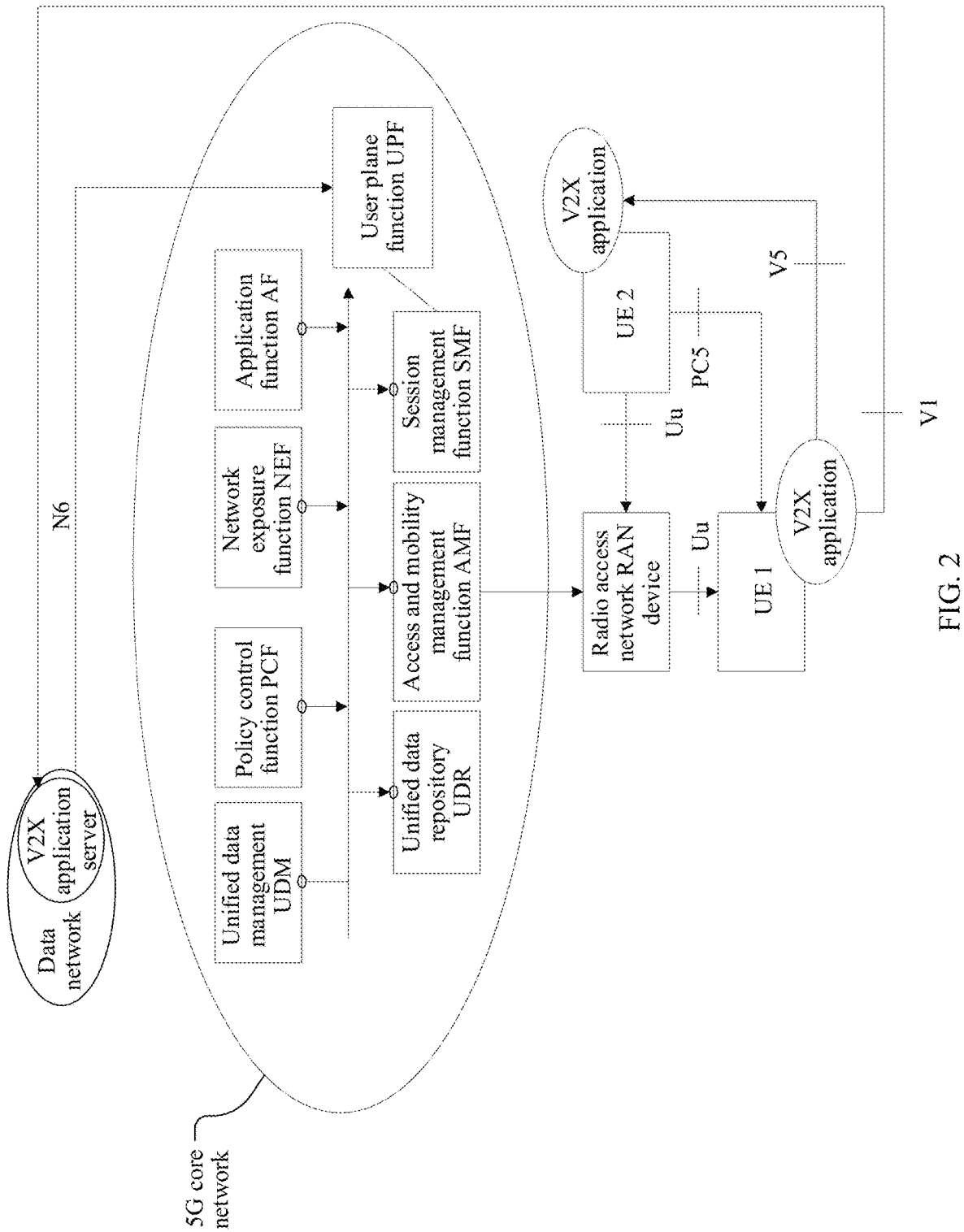
FIG. 2 is another schematic diagram of a network architecture to which a data processing method according to this application is applied.

Further, the data processing method provided in this application may be applied to V2X communication, and an application scenario may be shown in FIG. 2.

A 5G core network may include but is not limited to including a PCF entity, an AMF entity, an SMF entity, a UPF entity, a unified data management (UDM) network element, a unified data repository (UDR) network element, a network exposure function (NEF) network element, an application function (AF) entity, and the like.

Descriptions of the PCF entity, the AMF entity, the RAN device, the UPF entity, and the UE are those described in FIG. 1, and details are not described herein again.

The UDM network element manages and controls user data, for example, manages subscription information, where the management may include: obtaining the subscription information from the UDR network element and providing the subscription information for another network element (for example, the AMF entity), generating a 3GPP authentication credential for a terminal device, and registering and maintaining a network element currently serving the terminal device.

The UDR network element is configured to store the user data. The user data may include subscription data invoked by the UDM network element, policy information invoked by the PCF entity, structured data used for capability exposure, and application data invoked by the NEF network element.

The NEF network element is used for connection and interaction between another internal network element of the core network and an external application server of the core network, to provide network capability information for the external application server or provide information of the external application server for a core network element.

The SMF entity is responsible for control plane functions of UE session management that include UPF selection, IP address assignment, session QoS management, obtaining of a policy control and charging (PCC) policy (from a PCF), and the like.

The AF entity has an application service function, and interacts with the core network element to serve the terminal device, for example, interacts with the PCF entity to perform service policy control; interacts with the NEF network element to obtain the network capability information or provide application information for the network; or interacts with the PCF entity to provide data network access point information for the PCF entity, so that the PCF entity generates routing information of a corresponding data service.

One or more UEs (for example, UE 1 and UE 2 in FIG. 2) may access the RAN device through a Uu interface, and a connection may also be established between two or more UEs. For example, as shown in FIG. 2, a connection may be established between the UE 1 and the UE 2 through a ProSe communication 5 (PC5) interface and may be an independent signaling connection, a group communication connection, or the like.

The communication of a V2X service includes PC5 communication and Uu communication, that is, a V2X service may be performed by a V2X application server in a data network (Data Network) through the Uu interface or the PC5 interface. Usually, different frequency bands may be used for the Uu communication and the PC5 communication. Therefore, the Uu communication and the PC5 communication may be performed simultaneously.

It should be noted that the data processing method in an embodiment may be applied to the communication network shown in FIG. 1 or FIG. 2, may be applied to a 3G or 4G communication network, or may be applied to a future communication network, for example, a 6G network or a 7G network. In addition, names of the foregoing network elements are not limited, and may be replaced with names of network elements that have same or similar functions in the future communication network. This is not limited in this application.

Based on the network architectures in FIG. 1 and FIG. 2, the data processing method provided in this application may be applied to a group communication scenario. For example, for a group communication scenario, refer to FIG. 3.

Group communication is a communication connection established between a plurality of UEs. One of the plurality of UEs may be used as a group control device, and one or more other UEs are used as one or more group member devices, for example, a group member device 1, a group member device 2, and a group member device 3 in FIG. 3.

The group control device may manage each group member in a group communication group, for example, may perform a part of V2X service management, data management, and resource allocation on each group member. Usually, in the group communication scenario, the group member does not directly request a PC5 resource from an access network device, but the group control device requests the PC5 resource for PC5 communication of the group member from an access network device corresponding to the group control device.

For example, if the group communication includes four UEs, namely, UE 1, UE 2, UE 3, and UE 4, the UE 1 may be used as a group control device, and the UE 2, the UE 3, and the UE 4 are used as group member devices. The UE 1 may request, for the UE 2, the UE 3, and the UE 4, PC5 resources from an access network device corresponding to the UE 1.

A connection may be established between the group member device and the group control device through a Uu interface or a PC5 interface. In addition, when establishing a group communication connection to the group control device, the group member device may be in an idle state, that is, the group member device has no signaling connection to a communication network (an access network or a core network).

A person of skill in the art will understand that a group member is a member, in group communication, that accesses a group control device, and UE may be used as a carrier of the group member. In the following descriptions, a device that establishes a group communication connection to a group control device may be directly referred to as a group member, or may be referred to as a group member device.

Figure 3:
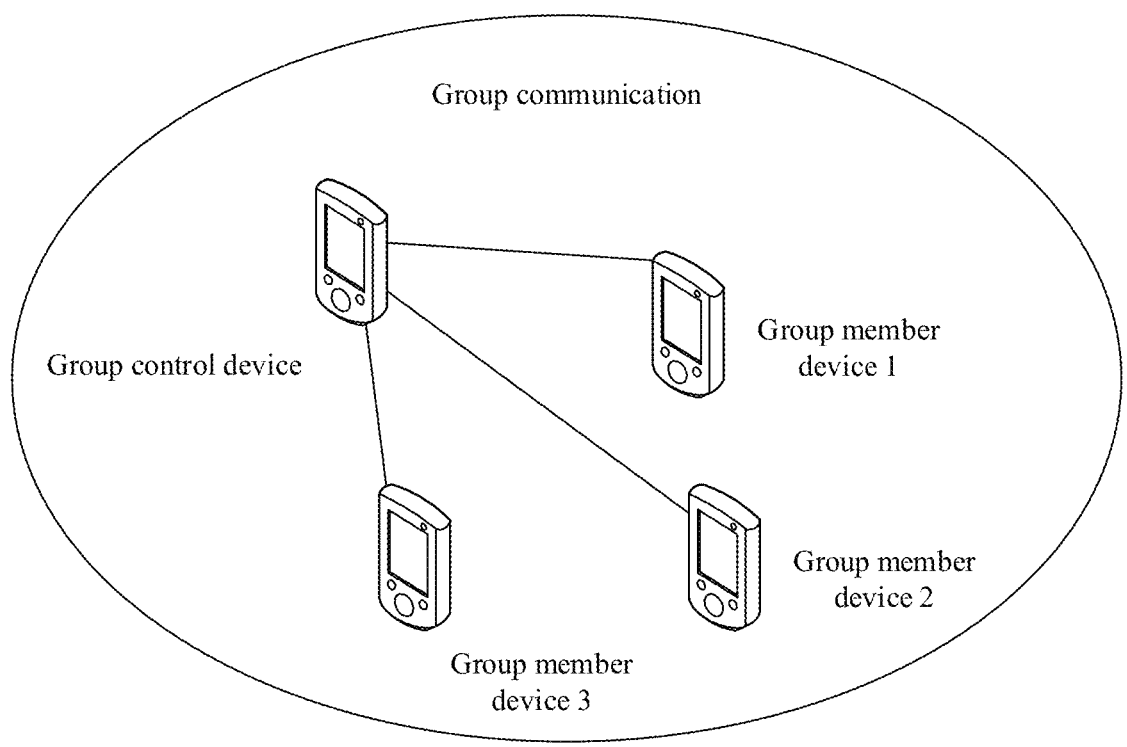
FIG. 3 is a schematic diagram of an application scenario to which a data processing method according to this application is applied.

Based on the network architectures in FIG. 1 and FIG. 2 or the application scenario in FIG. 3, the following describes the data processing method provided in this application.

Figure 4:
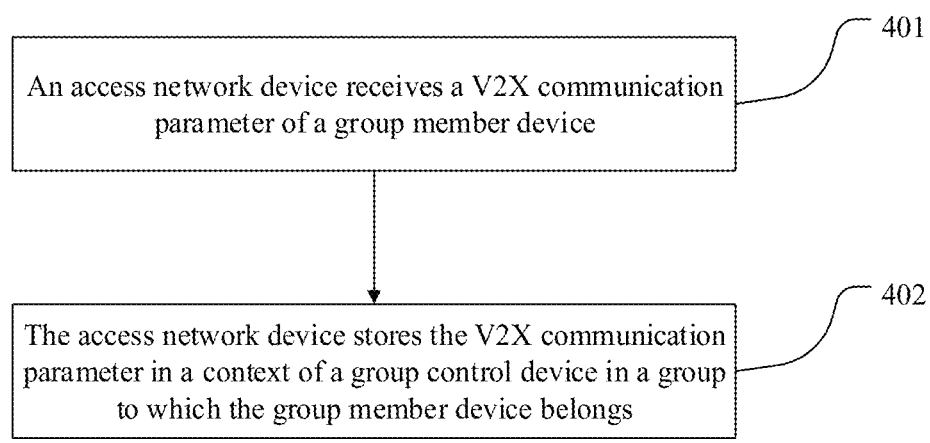
FIG. 4 is a schematic flowchart of a data processing method according to this application.

Refer to FIG. 4. An embodiment provides a data processing method. Details are described as follows.

401: An access network device receives a V2X communication parameter of a group member device.

The access network device is an access network device accessed by a group control device, and may be referred to as an access network device of the group control device below. In addition, an access network device accessed by the group member device may be the same as or may be different from the access network device accessed by the group control device.

In addition, before the access network device receives the V2X communication parameter of the group member device, a connection may have been established or not been established between the group control device and the group member device, and a connection status may be adjusted based on an actual application scenario. This is not limited in this application.

In an embodiment, when receiving the V2X communication parameter, the access network device may further receive one or more of an identifier of the group member device, an identifier of the group control device, or a group identifier. The one or more identifiers are used by the access network device to determine the group member device corresponding to the V2X communication parameter, a group to which the group member device belongs, the group control device in the group, and the like.

The V2X communication parameter may include at least one of V2X authorization information of the group member device, a PC5 quality of service (QoS) parameter of the group member device, or the like. For example, the V2X communication parameter may alternatively include only the V2X authorization information of the group member device, or may include both the V2X authorization information and the PC5 QoS parameter of the group member device. The V2X authorization information may be used to indicate whether the group member device can use a PC5 resource to perform communication of a V2X service. The PC5 QoS parameter is used to indicate a QoS parameter that can be used by the group member device in PC5 interface communication. The QoS parameter may include one or more of the following: a PC5 quality of service identifier (PQI), used to indicate a QoS requirement of the group member device; PC5 priority information (for example, a PC5 address resolution protocol (ARP) or a PC5 priority, used to indicate a scheduling priority of a PC5 resource); a PC5 guaranteed flow bit rate (GFBR); a PC5 maximum flow bit rate (MFBR); a PC5 QoS flow identifier (PFI); or the like.

In an embodiment, the access network device receives the V2X communication parameter of the group member device from a PCF entity.

In an embodiment, the access network device receives the V2X communication parameter of the group member device from the group control device. The access network device may directly receive the V2X communication parameter of the group member device from the group control device, and the PCF entity does not send the V2X communication parameter. This improves efficiency of receiving the V2X communication parameter of the group member device.

It should be noted that, in addition to the PCF entity or the group control device, another device that can obtain or has stored the V2X communication parameter of the group member device may alternatively send the V2X communication parameter. This may be adjusted based on an actual application scenario, and is not limited in this application.

402: The access network device stores the V2X communication parameter in a context of the group control device in the group to which the group member device belongs.

After receiving the V2X communication parameter of the group member device, the access network device stores the V2X communication parameter of the group member device for the group control device in the group to which the group member device belongs. The access network device stores the V2X communication parameter in the context of the group control device.

It should be noted that the V2X communication parameter may alternatively be stored in other data corresponding to the group control device in addition to the context of the group control device. This may be adjusted based on an actual application scenario.

The V2X communication parameter may be stored in a local storage device or a local memory of the access network device.

In an embodiment, after storing the V2X communication parameter of the group member device in the context of the group control device, the access network device allocates the PC5 resource to the group member device based on the V2X communication parameter of the group member device, and sends, to the group control device, information about the PC5 resource allocated to the group member device.

In an embodiment, the access network device receives a PC5 resource request message from the group control device, where the PC5 resource request message is used to request to allocate the PC5 resource to the group member device. The access network device allocates the PC5 resource to the group member device based on the PC5 resource request message and the stored V2X communication parameter of the group member device.

In an embodiment, after receiving the PC5 resource request message, the access network device determines that the PC5 resource request message is used to request to allocate the PC5 resource to the group member device. In this case, the access network device performs authorization check on the group member device based on the stored V2X communication parameter. Based on a determination that the group member device is successfully authorized, the access network device allocates the PC5 resource to the group member device, and sends, to the group control device, the information about the PC5 resource allocated to the group member device. The PC5 resource allocated to the group member device may be used by the group member device to perform communication of the V2X service, so that the V2X service is normally performed.

In an embodiment, the PC5 resource request message includes at least one of the following: a group member identification number, the PC5 quality of service identifier (PQI), the PC5 QoS flow identifier, a data volume, or the like of the group member device.

In an embodiment, before receiving the PC5 resource request message from the group control device, the access network device further receives the group member identification number of the group member device. The group member identification number is used by the access network device to identify the group member device.

In an embodiment, before receiving the PC5 resource request message from the group control device, the access network device may allocate the group member identification number to the group member device, and send the group member identification number to the group control device. In this way, the PC5 resource request message used by the group control device to request the PC5 resource for the group member device may carry the group member identification number.

In an embodiment, if the access network device receives the V2X communication parameter from the group control device, after receiving the V2X communication parameter, the access network device sends verification information to the PCF entity, where the verification information is used to indicate the PCF entity to verify the V2X communication parameter of the group member device. After verifying the V2X communication parameter, the PCF entity sends a verification reply message to the access network device. The access network device receives the verification reply information from the PCF entity. When the verification reply information is used to indicate that the V2X communication parameter of the group member device is successfully verified, the access network device stores the V2X communication parameter. Therefore, in an embodiment, after receiving the V2X communication parameter of the group member device from the group control device, the access network device may verify the V2X communication parameter, to store the correct V2X communication parameter of the group member device.

In an embodiment, the access network device may receive a radio resource control (RRC) message of the group control device, where the RRC message may include the V2X communication parameter of the group member device.

In an embodiment, the verification information includes the V2X communication parameter from the group control device and the identifier of the group member device. In this way, the PCF entity can identify the group member device corresponding to the V2X communication parameter, and verify the V2X communication parameter.

In an embodiment, the access network device further sends indication information to the PCF entity, where the indication information is used to indicate that the connection has been established between the group member device and the group control device. After the connection is established between the group member device and the group control device, the access network device sends the indication information to the PCF entity, to notify the PCF entity that the connection has been established between the group control device and the group member device.

In an embodiment, if the verification reply information indicates that the V2X communication parameter of the group member device fails to be verified, the access network device does not store the V2X communication parameter.

In an embodiment, if the verification reply information indicates that the V2X communication parameter of the group member device fails to be verified, the PCF entity may further send a correct V2X communication parameter of the group member device to the access network device.

Therefore, in an embodiment, the access network device may store the V2X communication parameter of the group member device and may allocate the PC5 resource to the group member device based on the V2X communication parameter of the group member device when receiving the PC5 resource request message from the group control device to request the PC5 resource for the group member device. In this way, the group member device may perform PC5 interface communication of the V2X service on the allocated PC5 resource, to avoid a case in which the group member device cannot perform data transmission of the V2X service on the PC5 resource because the access network device does not store the V2X communication parameter of the group member device and consequently cannot allocate the PC5 resource to the group member device.

In the embodiment in FIG. 4, the V2X communication parameter of the group member device received by the access network device may come from the PCF entity or may come from the group control device. The following further describes the two cases.

Figure 5:
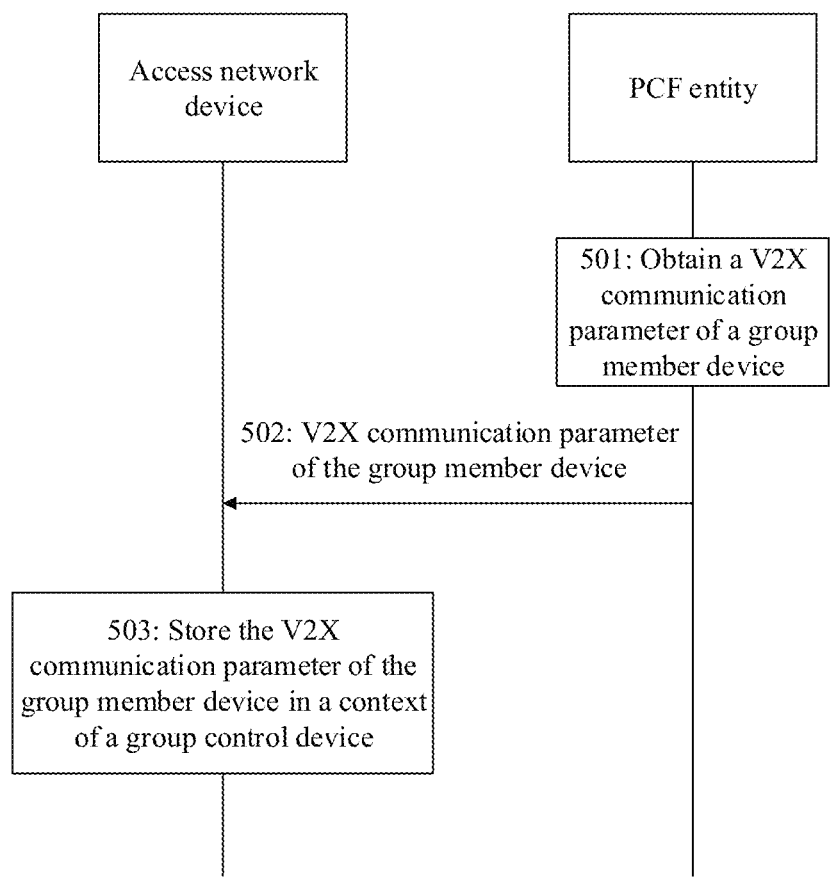
FIG. 5 is another schematic flowchart of a data processing method according to this application.

An embodiment in which the PCF entity sends the V2X communication parameter is first described. Refer to FIG. 5. An embodiment further provides another data processing method. Details are described as follows.

501: A PCF entity obtains a V2X communication parameter of a group member device.

The PCF entity is a PCF entity corresponding to a group control device, and the group control device and the group member device may correspond to a same PCF entity or may correspond to different PCF entities.

Based on a determination that the group control device and the group member device correspond to a same PCF entity, the PCF entity may obtain the V2X communication parameter of the group member device from locally stored data, or receive the V2X communication parameter of the group member device sent by a UDR corresponding to the group control device.

Based on a determination that the group control device and the group member device correspond to different PCF entities, the PCF entity corresponding to the group member device obtains the V2X communication parameter corresponding to the group member device from a UDR corresponding to the group member device, and then the PCF entity corresponding to the group member device sends the V2X communication parameter of the group member device to the PCF entity corresponding to the group control device.

It should be noted that based on a determination that the group control device and the group member device correspond to different PCF entities, the PCF entity corresponding to the group member device sends data on the group member device corresponding to the group control device. In the following embodiments, descriptions are provided by using in a scenario in which the group control device and the group member device correspond to a same PCF entity. A scenario in which the group control device and the group member device correspond to different PCF entities is not described again.

In an embodiment, before obtaining the V2X communication parameter of the group member device, the PCF entity may receive indication information, where the indication information is used to indicate that a connection has been established between the group member device and the group control device. The PCF entity obtains the V2X communication parameter based on the received indication information.

The PCF entity may obtain the locally stored V2X communication parameter of the group member device based on the indication information. Alternatively, the PCF entity receives the V2X communication parameter of the group member device from the UDR based on the indication information.

In an embodiment, the PCF entity may receive the indication information from an application server (AS), may receive the indication information from the group control device, may receive the indication information from the group member device, may receive the indication information from an access network device, or may receive the indication information from another device.

In an embodiment, after obtaining the V2X communication parameter of the group member device, the PCF entity performs authorization check on the group member device based on the V2X communication parameter. Based on a determination that the group member device is successfully authorized, the PCF entity associates the group member device with the group control device.

502: The PCF entity sends the V2X communication parameter of the group member device to the access network device.

After obtaining the V2X communication parameter of the group member device, the PCF entity sends the V2X communication parameter of the group member device to the access network device.

In an embodiment, the PCF entity may alternatively send the V2X communication parameter of the group member device to the group control device, and the group control device stores the V2X communication parameter of the group member device, so that the group control device may also perform authorization check on the group member device. This reduces workload of the access network device.

In an embodiment, the PCF entity further receives a group member identification number of the group member device from the group control device; the PCF entity receives a group member identification number of the group member device from the group member device; or the PCF entity allocates a group member identification number to the group member device. The group member identification number may be used based on a determination that the group control device requests a PC5 resource for the group member device.

In an embodiment, the PCF entity further sends the group member identification number to the access network device, so that the access network device can identify, based on the group member identification number, the group member device to which the PC5 resource is to be allocated.

In an embodiment, if the group member identification number is allocated by the PCF entity, after allocating the group member identification number to the group member device, the PCF entity further sends the group member identification number to the group member device, or sends the group member identification number to the group control device, or sends the group member identification number to the AS.

503: The access network device stores the V2X communication parameter of the group member device in a context of the group control device.

After receiving the V2X communication parameter of the group member device from the PCF entity, the access network device stores the V2X communication parameter in the context of the group control device, so that the access network device can allocate the PC5 resource to the group member device based on the V2X communication parameter of the group member device.

It should be noted that a process of step 503 in an embodiment is similar to the process described in step 402. Details are not described herein again.

In an embodiment, after obtaining the V2X communication parameter of the group member device, the PCF entity sends the V2X communication parameter to the access network device, so that the access network device can store the V2X communication parameter of the group member device in the context of the group control device. The access network device may allocate the PC5 resource to the group member device based on the V2X communication parameter of the group member device stored in the context of the group control device. In this way, the group member device may perform PC5 interface communication of a V2X service on the allocated PC5 resource, to avoid a case in which the group member device cannot perform data transmission of the V2X service on the PC5 resource because the access network device does not store the V2X communication parameter of the group member device and consequently cannot allocate the PC5 resource to the group member device.

Figure 6:
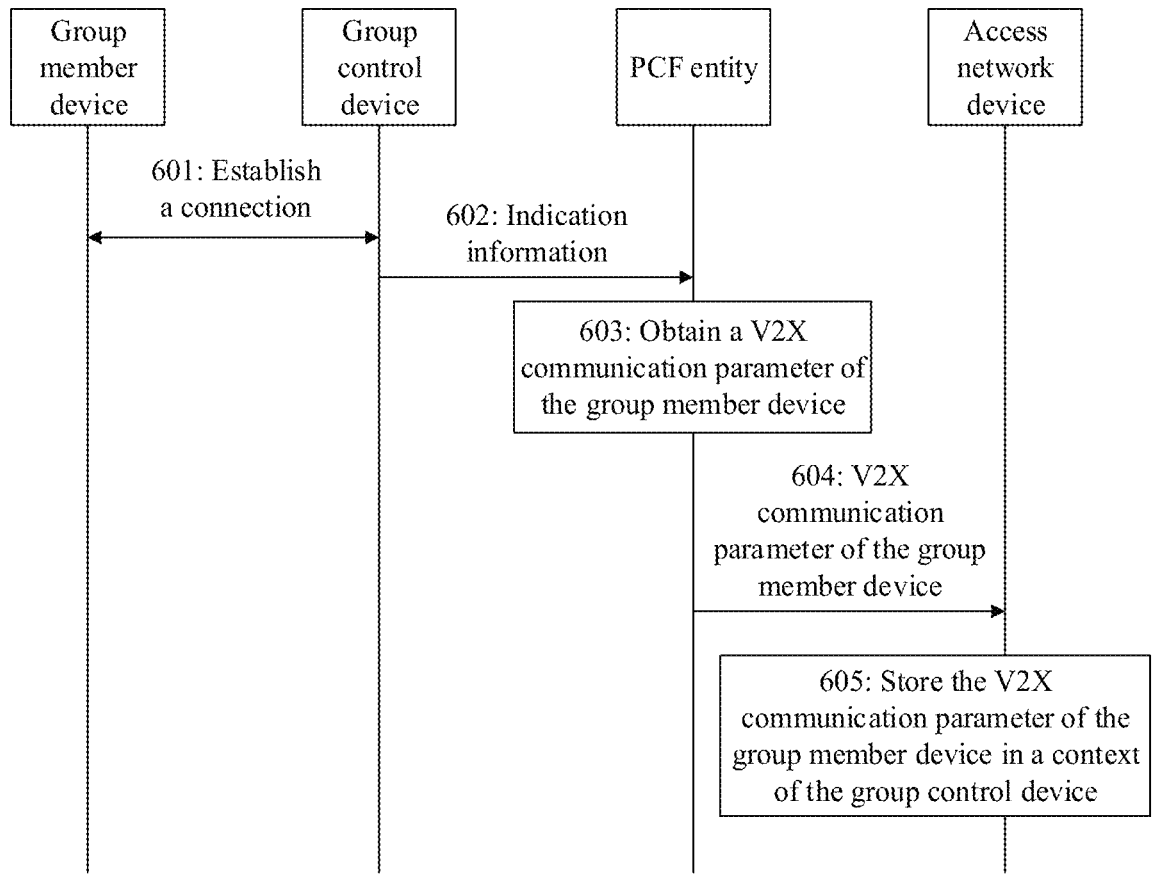
FIG. 6 is another schematic flowchart of a data processing method according to this application.

In a scenario in which the PCF entity sends the V2X communication parameter of the group member device to the access network device, the group control device may send the indication information to the PCF entity, to trigger the PCF entity to send the V2X communication parameter of the group member device to the access network device. Refer to FIG. 6. An embodiment further provides another data processing method. Details are described as follows.

601: A group member device establishes a connection to a group control device.

A group communication connection or another signaling connection may be established between the group member device and the group control device.

Based on a determination that the group communication connection is established between the group member device and the group control device, for the group communication connection, refer to the descriptions of the group communication connection in FIG. 3.

Based on a determination that another signaling connection is established between the group member device and the group control device, the signaling connection is a one-to-one signaling connection between the group member device and the group control device.

For example, for the connection established between the group control device and the group member device, refer to FIG. 3.

602: The group control device sends indication information to a PCF entity.

After the connection is established between the group member device and the group control device, the group control device may send the indication information to the PCF entity. The indication information is used to indicate that the connection has been established between the group control device and the group member device.

In an embodiment, the group control device sends the indication information to the PCF entity via an AS. After establishing the connection to the group member device, the group control device sends the indication information to the AS, and the AS forwards the indication information to the PCF entity. Alternatively, after establishing the connection to the group member device, the group control device sends the indication information to the AS, and the AS generates indication information in a different format based on the indication information, and then sends the indication information in the different format to the PCF entity.

603: The PCF entity obtains a V2X communication parameter of the group member device.

After receiving the indication information from the group control device, the PCF entity obtains the V2X communication parameter of the group member device.

604: The PCF entity sends the V2X communication parameter of the group member device to an access network device.

605: The access network device stores the V2X communication parameter of the group member device in a context of the group control device.

It should be noted that steps 603 to 605 in an embodiment are similar to steps 501 to 503 in FIG. 5. Similar content is not described herein again.

In an embodiment, the group control device further sends a group member identification number to the group member device, where the group member identification number may be used based on a determination that the group member device requests a PC5 resource.

In an embodiment, before the group control device sends the group member identification number to the group member device, a manner in which the group control device obtains the group member identification number may include: The group control device may allocate the group member identification number to the group member device, receive the group member identification number from the PCF entity, receive the group member identification number from the access network device, or obtain the group member identification number in another manner.

In an embodiment, after receiving the indication information from the group control device, the PCF entity determines that the connection has been established between the group member device and the group control device and may obtain the V2X communication parameter of the group member device. Then, the PCF entity sends the V2X communication parameter to the access network device, so that the access network device may store the V2X communication parameter of the group member device in the context of the group control device. The access network device may allocate the PC5 resource to the group member device based on the V2X communication parameter of the group member device stored in the context of the group control device. In this way, the group member device may perform PC5 interface communication of a V2X service on the allocated PC5 resource, to avoid a case in which the group member device cannot perform data transmission of the V2X service on the PC5 resource because the access network device does not store the V2X communication parameter of the group member device and consequently cannot allocate the PC5 resource to the group member device.

Figure 7:
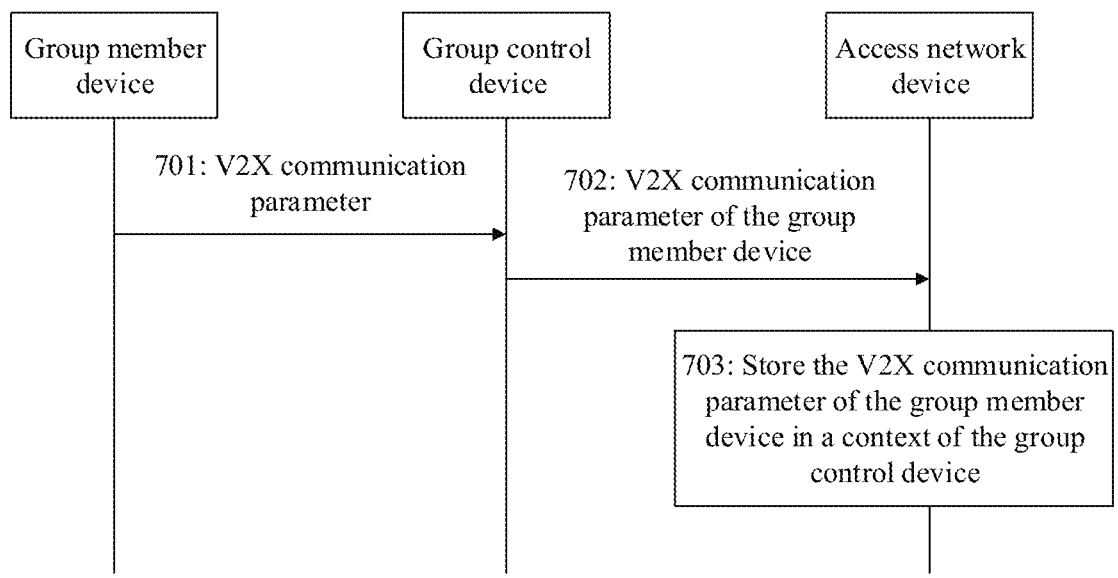
FIG. 7 is another schematic flowchart of a data processing method according to this application.

In addition, the V2X communication parameter of the group member device in this application may alternatively be sent by the group control device to the access network device. Refer to FIG. 7. An embodiment further provides another data processing method. Details are described as follows.

701: A group member device sends a V2X communication parameter to a group control device.

The group member device has stored the V2X communication parameter of the group member device. Therefore, the group member device may send, to the group control device, the V2X communication parameter stored in the group member device.

In addition, before the group member device sends the V2X communication parameter to the group control device, a connection may have been established or not been established between the group member device and the group control device.

702: The group control device sends the V2X communication parameter of the group member device to an access network device.

Based on a determination that receiving the V2X communication parameter from the group member device, the group control device sends the V2X communication parameter of the group member device to the access network device.

703: The access network device stores the V2X communication parameter of the group member device in a context of the group control device.

Step 703 in an embodiment is similar to step 402 above, and details are not described herein again.

In an embodiment, the group control device may alternatively store the V2X communication parameter of the group member device, to perform authorization check on the group member device subsequently.

In an embodiment, the group control device may send the V2X communication parameter of the group member device to the access network device without participation of a PCF entity. This can improve efficiency of obtaining the V2X communication parameter of the group member device by the access network device. In addition, the access network device may store the V2X communication parameter of the group member device in the context of the group control device. The access network device may allocate a PC5 resource to the group member device based on the V2X communication parameter of the group member device stored in the context of the group control device. In this way, the group member device may perform PC5 interface communication of a V2X service on the allocated PC5 resource, to avoid a case in which the group member device cannot perform data transmission of the V2X service on the PC5 resource because the access network device does not store the V2X communication parameter of the group member device and consequently cannot allocate the PC5 resource to the group member device.

The foregoing describes the data processing method provided in the embodiments. Further, after storing the V2X communication parameter of the group member device for the group control device, the access network device may allocate the PC5 resource to the group member device based on the stored V2X communication parameter of the group member device. The following further describes the data processing method provided in the embodiments.

Figure 8:
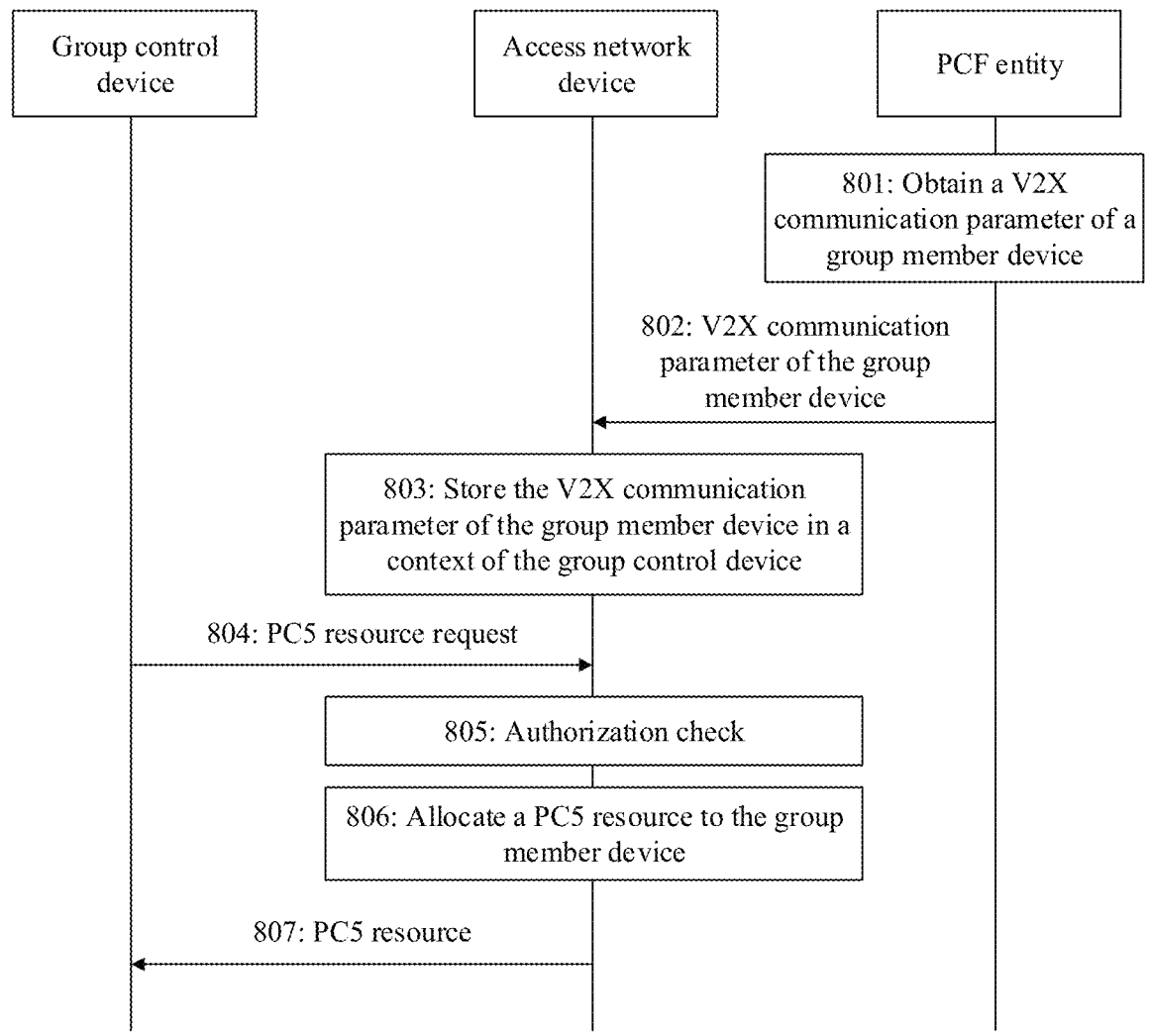
FIG. 8 is another schematic flowchart of a data processing method according to this application.

Refer to FIG. 8. FIG. 8 is a schematic diagram of an embodiment of a data processing method according to the embodiments. The method includes the following descriptions.

801: A PCF entity obtains a V2X communication parameter of a group member device.

802: The PCF entity sends the V2X communication parameter of the group member device to an access network device.

803: The access network device stores the V2X communication parameter of the group member device in a context of a group control device.

It should be noted that steps 801 to 803 in an embodiment are similar to steps 501 to 503 above, and details are not described herein again.

804: The group control device sends a PC5 resource request message to the access network device.

The group control device sends the PC5 resource request message to the access network device, where the PC5 resource request message is used to request the access network device to allocate a PC5 resource to at least one group member device. The at least one group member device may be one or more group member devices. The one or more group member devices each have established a connection to the group control device before the group control device sends the PC5 resource request message to the access network device. Therefore, the group control device may request the PC5 resource for the one or more group member devices from the access network device.

The PC5 resource may be used by the group member device to perform communication of a V2X service.

The PC5 resource request message may carry an identifier of each of the one or more group member devices and one or more of a PC5 QoS flow identifier, a PC5 quality of service identifier (PQI), a data volume, or the like of each of the one or more group member devices. The PQI may be used to indicate a quality class of PC5 communication of the group member device, and the data volume is used by the group member device to perform communication of the V2X service.

Usually, the group control device may actively send the PC5 resource request message to the access network device, to request the PC5 resource for the group member device; or may send the PC5 resource request message to the access network device after receiving the PC5 resource request message from the group member device, to request the PC5 resource for the group member device. This may be adjusted based on an actual application scenario and is not limited in this application.

The PC5 resource request message may carry the identifier of the group member device and at least one of the PC5 QoS flow identifier, the PC5 PQI, or the data volume of the group member device. In this way, the access network device may identify the group member device based on the identifier of the group member device and allocate the PC5 resource to the group member device based on the stored V2X communication parameter of the group member device and the at least one of the PC5 QoS flow identifier, the PC5 PQI, or the data volume of the group member device.

805: The access network device performs authorization check.

After receiving the PC5 resource request message from the group control device, the access network device determines the one or more group member devices to which the PC5 resource is to be allocated. Then, the access network device performs authorization check on the one or more group member devices.

The access network device may determine, based on the identifier of the group member device carried in the PC5 resource request message, the one or more group member devices to which the PC5 resource is to be allocated, and search for a V2X communication parameter of each of the one or more group member devices. Then, the access network device performs authorization check on each group member device based on the V2X communication parameter of the group member device, to determine whether the group member device is successfully authorized.

The authorization check performed on the group member device means determining, based on the V2X communication parameter of the group member device, whether the group member device can perform communication of the V2X service. Alternatively, if the group member device can perform communication of the V2X service, the authorization check performed on the group member device means further checking, with reference to the PC5 resource request message, a quality-of-service class or the like of the V2X service performed by the group member device. If the access network device determines, based on the V2X communication parameter, that the group member device can perform communication of the V2X service, or determines the quality-of-service class of the V2X service for the group member device, the access network device may determine that the authorization check performed on the group member device succeeds.

A person of skill in the art will understand that the authorization check may be performed on the group member device, the group member device may be understood as a carrier of a group member, and the group member is a member in group communication. Therefore, the authorization check may alternatively be understood as authorization check performed on the group member device. The authorization check may be checking V2X authorization information of the group member device, for example, checking whether the group member device is authorized to perform communication of the V2X service or whether the group member device can use the PC5 resource for communication. Therefore, in an embodiment, the access network device may perform authorization check on the group member device, to determine whether the PC5 resource can be allocated to the group member device. This avoids blind PC5 resource allocation and improves resource utilization.

806: The access network device allocates the PC5 resource to the group member device.

After performing authorization check on each group member device, the access network device allocates the PC5 resource to the one or more group member devices based on a result of the authorization check.

Based on a determination that a group member device in the one or more group member devices is successfully authorized, the access network device may allocate a PC5 resource to the group member device; or if the group member device fails to be authorized, the access network device does not allocate the PC5 resource to the group member device. The PC5 resource may be a time-frequency resource that can be used by the group member device to transmit data over a PC5 interface.

In an embodiment, if a V2X communication parameter of a group member device in the one or more group member devices includes a PC5 QoS parameter of the group member device, the access network device may allocate a PC5 resource to the group member device based on the QoS parameter of the group member device and data carried in the PC5 resource request message.

In an embodiment, when allocating the PC5 resource to the group member device, the access network device may further allocate the PC5 resource to the group member device with reference to one or more of the PC5 QoS flow identifier, the PQI, the data volume, or the like carried in the PC5 resource request message in addition to the QoS parameter of the group member device. For example, a class of the PC5 resource to be allocated to the group member device may be determined based on a value of the PQI and with reference to the QoS parameter in the V2X communication parameter, to allocate the PC5 resource to each group member device; and/or the PC5 resource may be allocated to the group member device with reference to the data volume of the group member device. For example, if the PQI of the group member device represents a higher QoS requirement (usually, a shorter latency and higher reliability indicate a higher QoS requirement), or the data volume is larger, more PC5 resources may be allocated to the group member device.

807: The access network device sends information about the PC5 resource to the group control device.

After allocating the PC5 resource to the group member device, the access network device sends the information about the PC5 resource to the group control device, so that after receiving the information about the PC5 resource, the group control device notifies each group member device of the PC5 resource that can be used.

It should be noted that steps 804 to 807 in an embodiment are optional steps.

Usually, if the PC5 resource request message sent by the group control device to the access network device is used to request the access network device to allocate PC5 resources to a plurality of group member devices, after determining that the group member devices are all successfully authorized, the access network device allocates the PC5 resources to the plurality of group member devices.

In an embodiment, the access network device may directly notify the group control device of information about the allocated PC5 resources, and then the group control device divides the PC5 resources allocated by the access network device, to allocate a corresponding PC5 resource to each group member device. The access network device notifies the group control device of all the PC5 resources allocated to the plurality of group member devices and does not separately allocate the PC5 resource to each group member device or perform real-time PC5 resource scheduling for each group member device, so that signaling overheads of the access network device can be reduced.

In an embodiment, alternatively, after allocating a PC5 resource to each group member device, the access network device may notify the group control device of the PC5 resource allocated to each group member device, and then the group control device notifies each group member device of the corresponding PC5 resource.

In an embodiment, if the PC5 resource request message sent by the group control device to the access network device is used to request the access network device to allocate a PC5 resource to one group member device, the access network device allocates the PC5 resource to the group member device after determining that the group member device is successfully authorized and notifies the group control device of the allocated PC5 resource. The group control device may directly allocate the PC5 resource to the group member device, without performing detailed division.

In an embodiment, after receiving the V2X communication parameter of the group member device, the access network device stores the V2X communication parameter of the group member device in the context of the group control device. Then, after receiving the PC5 resource request message, the access network device allocates the PC5 resource to the group member device based on the stored V2X communication parameter. Therefore, the access network device may allocate the PC5 resource to the group member device based on the stored V2X communication parameter, so that the group member device can perform communication on the PC5 resource allocated by the access network device. This can avoid a case in which the group member device cannot perform PC5 communication because the access network device cannot determine whether the group member device can be authorized and consequently the access network device refuses to allocate the PC5 resource to the group member device.

Figure 9:
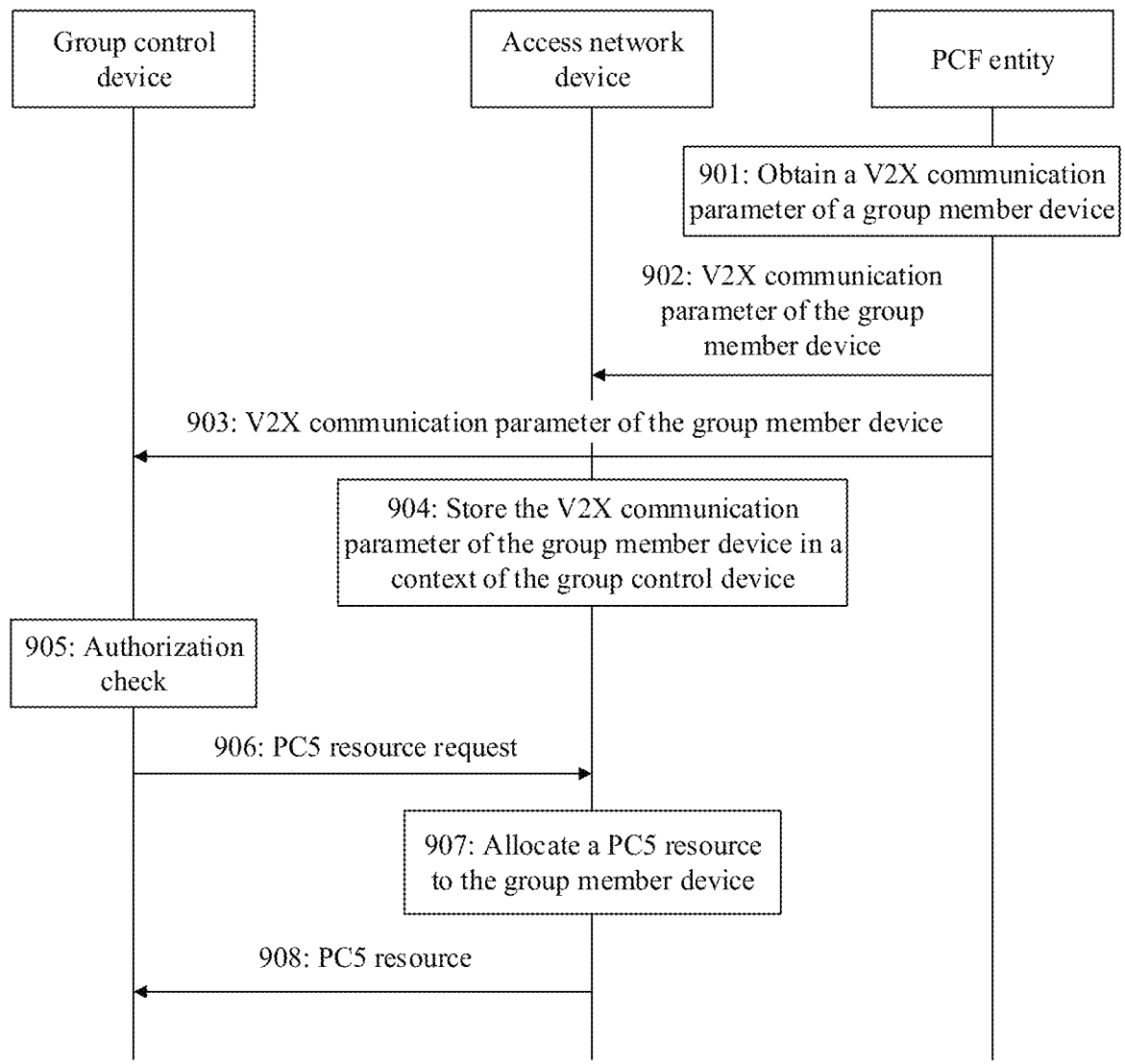
FIG. 9 is another schematic flowchart of a data processing method according to this application.

In this application, in addition to being performed by the access network device, the authorization check may alternatively be performed by the group control device if the group control device stores the V2X communication parameter of the group member device. The following uses one group member device as an example to describe a scenario in which the group control device performs authorization check. Refer to FIG. 9. FIG. 9 is a schematic diagram of an embodiment of a data processing method according to the embodiments. The method includes the following descriptions.

901: A PCF entity obtains a V2X communication parameter of a group member device.

902: The PCF entity sends the V2X communication parameter of the group member device to an access network device.

903: The access network device stores the V2X communication parameter of the group member device in a context of a group control device.

It should be noted that steps 901 to 903 in an embodiment are similar to steps 501 to 503 above, and details are not described herein again.

904: The PCF entity sends the V2X communication parameter of the group member device to the group control device.

After receiving the V2X communication parameter of the group member device sent by the PCF entity, the group control device may store the V2X communication parameter of the group member device.

A sequence of performing step 902 and step 903 is not limited in an embodiment. Step 902 may be first performed, step 903 may be first performed, or step 902 and step 903 may be simultaneously performed. The order may be adjusted based on an actual application scenario.

905: The group control device performs authorization check.

The group control device performs authorization check on the group member device based on the stored V2X communication parameter of the group member device.

The group control device may determine, based on the V2X communication parameter of the group member device, whether the group member device can perform communication of a V2X service.

906: The group control device sends a PC5 resource request message to the access network device.

If determining that the group member device is successfully authorized, the group control device sends the PC5 resource request message to the access network device. If determining that the group member device fails to be authorized, the group control device does not send the PC5 resource request message to the access network device.

907: The access network device allocates a PC5 resource to the group member device.

After receiving the PC5 resource request message sent by the group control device, the access network device does not perform authorization check on the group member device and may directly allocate the PC5 resource to the group member device based on information carried in the PC5 resource request message.

At step 907 in an embodiment of an application is similar to step 806 above, and details are not described herein again.

908: The access network device sends information about the PC5 resource to the group control device.

Step 908 in an embodiment is similar to step 807 above, and details are not described herein again.

In an embodiment, the PCF entity may send the V2X communication parameter of the group member device to the group control device, and the group control device performs authorization check. The access network device may not perform authorization check on the group member device. After the group control device performs authorization check on the group member device and determines that the group member device is successfully authorized, the group control device sends the PC5 resource request message of the group member device to the access network device. After receiving the PC5 resource request message, the access network device may directly allocate the PC5 resource without performing authorization check, to reduce a working process of the access network device and improve efficiency of allocating the PC5 resource by the access network device. If the group control device performs authorization check on the group member device and determines that the group member device fails to be authorized, the group control device does not request the PC5 resource for the group member device, to further reduce workload of the access network device and improve work efficiency of the access network device. In addition, the access network device may store the V2X communication parameter of the group member device in the context of the group control device. The access network device may allocate the PC5 resource to the group member device based on the V2X communication parameter of the group member device stored in the context of the group control device. In this way, the group member device may perform PC5 interface communication of the V2X service on the allocated PC5 resource, to avoid a case in which the group member device cannot perform data transmission of the V2X service on the PC5 resource because the access network device does not store the V2X communication parameter of the group member device and consequently cannot allocate the PC5 resource to the group member device.

Figure 10:
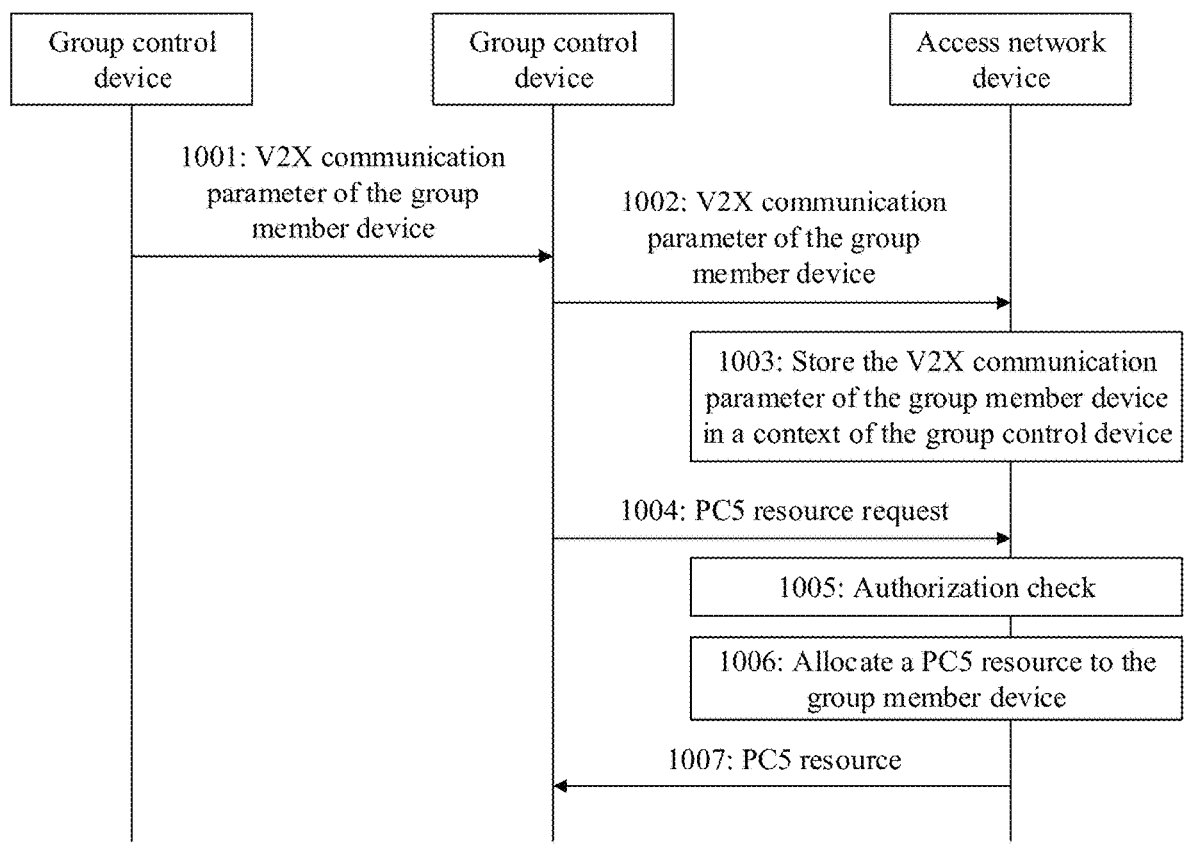
FIG. 10 is another schematic flowchart of a data processing method according to this application.

FIG. 8 and FIG. 9 provide descriptions of steps in which the PCF entity sends the V2X communication parameter of the group member device to the access network device. The following describes steps in which the group control device sends the V2X communication parameter of the group member device to the access network device. Refer to FIG. 10. FIG. 10 is a schematic diagram of an embodiment of a data processing method according to the embodiments. The method includes the following descriptions.

1001: A group member device sends a V2X communication parameter to a group control device.

1002: The group control device sends the V2X communication parameter of the group member device to an access network device.

1003: The access network device stores the V2X communication parameter of the group member device in a context of the group control device.

It should be noted that steps 1001 to 1003 in an embodiment are similar to steps 701 to 703 above, and details are not described herein again.

1004: The group control device sends a PC5 resource request message to the access network device.

1005: The access network device performs authorization check.

1006: The access network device allocates a PC5 resource to the group member device.

1007: The access network device sends information about the PC5 resource to the group control device.

It should be noted that steps 1004 to 1007 in an embodiment are similar to steps 804 to 807 above, and details are not described herein again.

In an embodiment, after receiving the V2X communication parameter of the group member device sent by the group control device, the access network device may also store the V2X communication parameter of the group member device, and then the group control device performs authorization check on the group member device. For an authorization check process and a subsequent PC5 resource allocation process, refer to steps 905 to 908 above. Details are not described herein again.

In an embodiment, the group control device may send the V2X communication parameter of the group member device to the access network device without participation of the PCF entity. This can improve efficiency of obtaining the V2X communication parameter of the group member device by the access network device. In addition, the access network device may store the V2X communication parameter of the group member device in the context of the group control device. When receiving the PC5 resource request message used by the group control device to request the PC5 resource for the group member device, the access network device may allocate the PC5 resource to the group member device based on the V2X communication parameter of the group member device stored in the context of the group control device. The group member device may perform PC5 interface communication of a V2X service on the allocated PC5 resource, to avoid a case in which the group member device cannot perform data transmission of the V2X service on the PC5 resource because the access network device does not store the V2X communication parameter of the group member device and consequently cannot allocate the PC5 resource to the group member device.

The foregoing describes in detail the data processing method provided in the embodiments. The following describes, with reference to application scenarios, examples of the data processing method provided in this application.

Figure 11:
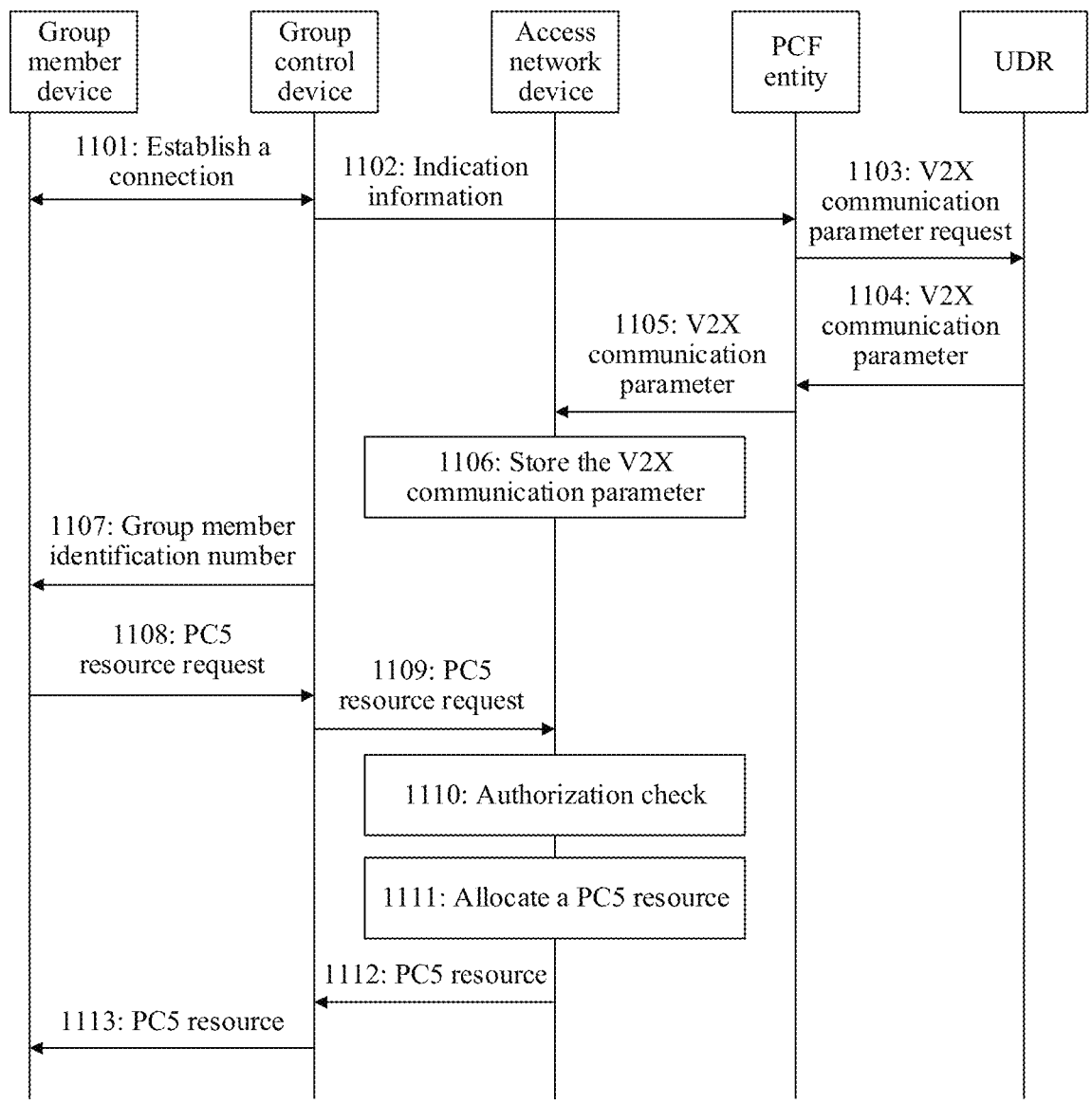
FIG. 11 is another schematic flowchart of a data processing method according to this application.

Scenario 1: Refer to FIG. 11. FIG. 11 is a schematic diagram of an embodiment of a data processing method according to the embodiments. The method may include the following steps.

1101: A group member device establishes a connection to a group control device.

, for the connection between the group member device and the group control device, refer to step 601 above, and details are not described herein again.

In an embodiment, after a group communication connection is established between the group member device and the group control device, the group communication may correspond to a group identifier (Group ID).

The group identifier may be directly allocated by the group control device after the group communication connection is established between the group control device and the group member device. Alternatively, the group identifier may be allocated by a PCF entity in advance and then sent to the group control device, and the group identifier corresponding to the group communication may be determined after the group communication connection is established between the group control device and the group member device. The order may be adjusted based on an actual application scenario and is not limited in this application.

For example, in a scenario, the group control device and the group member device are UE. After a connection is established between UE 1 and UE 2, the UE 1 may be used as a group control device, and the UE 2 is used as a group member device; or the UE 2 may be used as a group control device, and the UE 1 is used as a group member device. The order may be adjusted based on an actual application scenario and is not limited in this application.

1102: The group control device sends indication information to the PCF entity.

The indication information in an embodiment is similar to the indication information in step 602 above.

After the connection is established between the group control device and the group member device, the group control device may send the indication information to the PCF entity corresponding to the group control device. The indication information may be used to indicate that the connection has been established between the group control device and the group member device. In another scenario, the indication information may be further used to indicate to request to perform authorization check on the group member device.

The indication information may include an identifier of the group member device. Optionally, the indication information further includes one or more of an identifier of the group control device, a group identifier, or a group member joining indication.

For example, in an embodiment, the identifier of the group member device may be a common identification number of the group member device, for example, a subscriber permanent identifier (SUPI), a subscription concealed identifier (SUCI), or a global unique temporary identifier (GUTI); or may be a group member identification number allocated by the group control device or the PCF entity. The identifier of the group member device may include both the common identification number of the group member device and the group member identification number allocated by the group control device. The group member identification number may be randomly allocated or may be allocated according to a preset rule. The preset rule may include: a length of the group member identification number is a preset value; the group member identification number is obtained through arrangement performed in a preset sequence; or there is another preset rule.

In an embodiment, if the identifier of the group member device includes the group member identification number, the group member identification number may be directly allocated by the group control device and then included in the indication information. The group member identification number may be used based on a determination that the group member device requests a PC5 resource.

In an embodiment, if the identifier of the group member device is the group member identification number and is allocated by the PCF entity, the PCF entity sends the identifier to the group control device before the group control device sends the indication information, so that the indication information may carry the group member identification number.

In an embodiment, if the PCF entity allocates the group member identification number, the PCF entity may alternatively send the group member identification number to an access network device in addition to the group control device and/or the group member device.

In a scenario, the indication information may not carry the group member identification number, and the PCF entity allocates the group member identification number to the group member device after receiving the indication information.

Usually, after establishing the group communication connection to the group member device, the group control device notifies the PCF entity. The group control device may send the indication information to the PCF entity, to notify the PCF entity that the group communication connection has been established between the group control device and the group member device.

In addition, the indication information usually cannot be directly sent by the group control device to the PCF entity but may be forwarded by an AMF entity. The group control device may initiate uplink non-access stratum (NAS) transmission to the AMF entity and send the indication information to the AMF entity by using a NAS message. Then, the AMF entity sends the indication information to the PCF entity by using an N11 message. It should be understood that in an embodiment, based on a determination that the PCF entity transmits data or a message to the access network device, the group control device, or the like, the data or the message may be forwarded by the AMF entity. Details are not described one by one in an embodiment.

1103: The PCF entity sends a V2X communication parameter request message to a UDR.

After receiving the indication information from the group control device, the PCF entity determines that the connection has been established between the group member device and the group control device, and the PCF entity may request a V2X communication parameter of the group member device from the UDR. The PCF entity may send the V2X communication parameter request message to the UDR, to request the V2X communication parameter of the group member device.

For example, the V2X communication parameter request message may carry the SUPI of the group member device, so that the UDR can identify the group member device based on the identifier of the group member device, and further extract the V2X communication parameter of the group member device from stored user data. That the PCF entity may obtain the SUPI based on the identifier of the group member device included in the indication information may include: If the identifier of the group member device includes the SUPI, the PCF entity may directly identify the SUPI in the indication information. If the identifier of the group member device includes the SUCI, the PCF entity obtains the SUPI based on the SUCI. The PCF entity may obtain the SUPI via an access and mobility management function (AMF) and/or an authentication server function (AUSF) based on the SUCI. If the identifier of the group member device includes the GUTI, the PCF entity may obtain the SUPI based on the GUTI. The PCF entity may obtain the SUPI via the AMF.

1104: The UDR sends the V2X communication parameter to the PCF entity.

After obtaining the V2X communication parameter of the group member device, the UDR sends the V2X communication parameter to the PCF entity.

Usually, the UDR stores the user data, the V2X communication parameter request message may carry the identifier of the group member device, and the UDR may search a database or a memory for the V2X communication parameter of the group member device based on the identifier of the group member device, and then send the V2X communication parameter to the PCF entity.

In an embodiment, the PCF entity may alternatively obtain the V2X communication parameter of the group member device from locally stored data in addition to the UDR. This may be adjusted based on an actual application scenario and is not limited herein.

A person of skill in the art will understood that if the PCF entity obtains the V2X communication parameter of the group member device from the locally stored data, steps 1103 and 1104 do not be performed.

1105: The PCF entity sends the V2X communication parameter to the access network device.

After obtaining the V2X communication parameter, the PCF entity sends the V2X communication parameter to the access network device.

In an embodiment, after receiving the V2X communication parameter, the PCF entity may perform authorization check on the group member device based on the V2X communication parameter. If the group member device is successfully authorized, the group control device may be associated with the group member device. The PCF entity may alternatively directly associate the group control device with the group member device. Alternatively, if the group member device fails to be authorized, the group control device may also be associated with the group member device. This may be adjusted based on an actual application scenario and is not limited in this application.

In an embodiment, the associating the group control device with the group member device may include: The PCF entity stores the V2X communication parameter of the group member device into data related to the group control device. Alternatively, the PCF entity stores the identifier of the group member device into data related to the group control device. Alternatively, the PCF entity stores the identifier of the group control device into data related to the group member device. Alternatively, the PCF entity adds indication data to data related to the group control device, where the indication data is used to indicate that the connection has been established between the group control device and the group member device. Alternatively, the PCF entity stores the V2X communication parameter or the identifier of the group member device into group communication data, where the group communication data is stored in the PCF entity, and the group communication data may include data and the like of the group control device and each group member device. For example, the PCF entity stores a group communication table, the group communication table includes the identifier of the group control device and the identifier of the group member device. A manner of associating the group control device with the group member device may be adjusted based on an actual application scenario. This is not limited in an embodiment, and examples are merely provided for description.

The V2X communication parameter of the group member device may include V2X authorization information, a PC5 QoS parameter, and/or the like of the group member device. For detailed descriptions of the V2X communication parameter, refer to step 401 above.

In an embodiment, when sending the V2X communication parameter of the group member device to the access network device, the PCF entity further sends one or more of the identifier of the group member device, the identifier of the group control device, the group identifier, or the like, so that the group control device determines, based on the foregoing identifier, how to store the V2X communication parameter of the group member device. The V2X communication parameter and the one or more of the identifier of the group member device, the identifier of the group control device, the group identifier, or the like may be sent by using a same message or may be sent separately.

In an embodiment, in addition to sending the V2X communication parameter of the group member device to the access network device, the PCF entity may alternatively send the V2X communication parameter of the group member device to the group control device, and the group control device performs authorization check. In addition, if the PCF entity does not send the V2X communication parameter of the group member device to the group control device, but allocates the group member identification number to the group member device, the PCF entity may separately send the group member identification number to the group control device, so that the group control device sends the group member identification number to the group member device.

In a scenario, the PCF entity may invoke a Namf_Communication_N1N2MessageTransfer service. The PCF entity sends the V2X communication parameter to the access network device by using an N2 message; or the PCF entity sends the V2X communication parameter to the group control device by using an N1 message, and the group control device performs authorization check. Alternatively, if the PCF entity does not send the V2X communication parameter to the group control device, but allocates the group member identification number to the group member device, the PCF entity may directly send the group member identification number to the group control device by using an N1 message.

1106: The access network device stores the V2X communication parameter.

Step 1106 in an embodiment is similar to step 402 above, and details are not described again.

In an embodiment, if the access network device stores the V2X communication parameter of the group member device, the access network device notifies the PCF entity or the group control device, so that the PCF entity or the group control device determines that the access network device corresponding to the group control device has stored the V2X communication parameter of the group member device.

1107: The group control device sends the group member identification number to the group member device.

The group member identification number of the group member device may be allocated by the group control device or may be allocated by the PCF entity and then notified to the group control device. After determining the group member identification number of the group member device, the group control device may send the group member identification number to the group member device. The group member identification number may be used based on a determination that the group member device requests the PC5 resource.

In an embodiment, if the group member identification number of the group member device is allocated by the PCF entity, the PCF entity may further send the group member identification number to the group member device.

1108: The group member device sends a PC5 resource request message to the group control device.

When requiring the PC5 resource, the group member device may send the PC5 resource request message to the group control device. The PC5 resource request message is used to request the PC5 resource. For example, the PC5 resource may be used by the group member device to perform communication of a V2X service.

The PC5 resource request message may carry the group member identification number of the group member device, and may further carry at least one of a PC5 QoS flow identifier, a PC5 PQI, or a data volume of the group member device.

1109: The group control device sends the PC5 resource request message to the access network device.

Step 1109 in an embodiment is similar to step 804 above, and details are not described again.

1110: The access network device performs authorization check.

Step 1110 in an embodiment is similar to step 805 above, and details are not described again.

In addition, it should be noted that in addition to the access network device, the group control device may alternatively perform authorization check if the group control device stores the V2X communication parameter of the group member device. If the group member device is successfully authorized, the group control device directly sends the PC5 resource request message to the access network device, and the access network device does not perform authorization check. For steps, refer to steps 905 to 908 above.

1111: The access network device allocates the PC5 resource.

After determining that the group member device is successfully authorized, or after receiving the PC5 resource request message from the group control device, the access network device may allocate the PC5 resource to the group member device.

A step in step 1111 in an embodiment is similar to that in step 806 above, and details are not described herein again.

1112: The access network device sends information about the PC5 resource to the group control device.

Step 1112 in an embodiment is similar to step 807 above, and details are not described herein again.

1113: The group control device sends the information about the PC5 resource to the group member device.

Usually, if the group control device requests a PC5 resource for one group member device, the access network device allocates the PC5 resource to the group member device.

If the group control device requests PC5 resources for a plurality of group member devices, the access network device may allocate the PC5 resources to the plurality of group member devices, and the group control device performs detailed division for the group member devices. Alternatively, if the group control device requests PC5 resources for a plurality of group member devices, the access network device may directly allocate a PC5 resource to each of the plurality of group member devices, and then the group control device notifies each group member device.

An embodiment in step 1113 in an embodiment is similar to that in step 807 above, and details are not described herein again.

In an embodiment, after receiving the V2X communication parameter of the group member device from the PCF entity, the access network device stores the V2X communication parameter of the group member device in a context of the group control device. Then, after receiving the PC5 resource request message, the access network device allocates the PC5 resource to the group member device based on the stored V2X communication parameter. Therefore, based on a determination that the group control device requests the PC5 resource for the group member device, the access network device may allocate the PC5 resource to the group member device based on the stored V2X communication parameter of the group member device, so that the group member device can perform communication on the PC5 resource allocated by the access network device.

Figure 12:
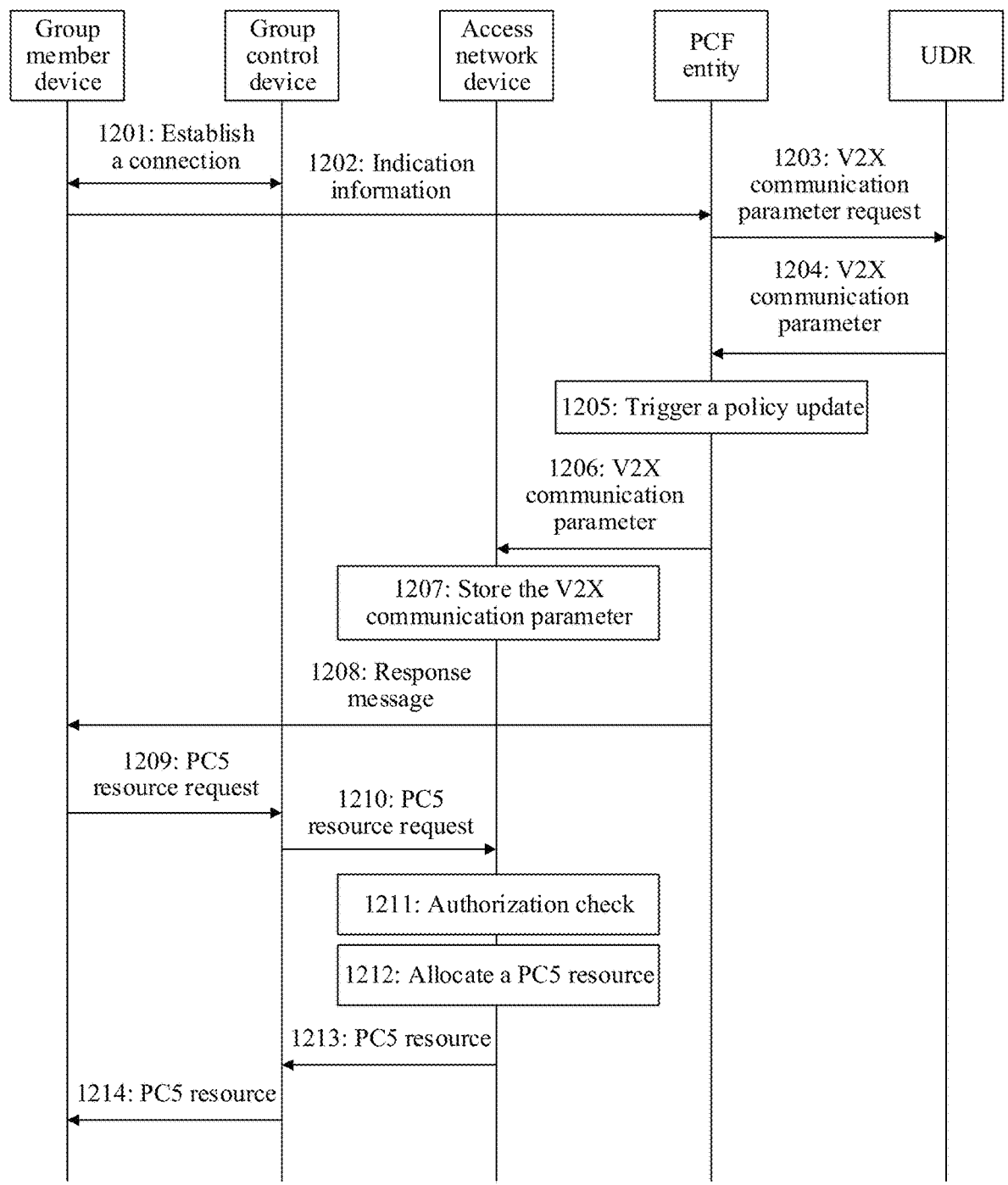
FIG. 12 is another schematic flowchart of a data processing method according to this application.

Scenario 2: refer to FIG. 12. FIG. 12 is a schematic diagram of an embodiment of a data processing method according to the embodiments of this application. The method may include the following steps.

1201: A group member device establishes a connection to a group control device.

It should be understood that step 1201 in an embodiment is similar to step 601 above, and details are not described herein again.

1202: The group member device sends indication information to a PCF entity.

The group member device sends the indication information to the PCF entity corresponding to the group control device, where the indication information may be used to indicate that the connection has been established between the group control device and the group member device. Optionally, the indication information may be further used to indicate to request to perform authorization check on the group member device.

It should be noted that in an embodiment, the group member device and the group control device may correspond to a same PCF entity. Therefore, in an embodiment, that the group member device sends the indication information to the PCF entity corresponding to the group control device may be understood as that the group member device sends the indication information to the PCF entity corresponding to the group member device. Based on a determination that the group member device and the group control device correspond to different PCF entities, the group member device usually can send the indication information to the PCF entity corresponding to the group member device, the following steps 1203 to 1205 are steps performed by the PCF entity corresponding to the group member device, and the following steps 1206 to 1214 are steps performed by the PCF entity corresponding to the group control device. In an embodiment, an example is used to describe a scenario in which the group member device and the group control device correspond to the same PCF entity.

The indication information may include an identifier of the group control device, and optionally, further includes one or more of an identifier of the group member device, a group identifier, a group member joining indication, or the like. The group member joining indication may be used to indicate that the connection has been established between the group member device and the group control device. This may be understood as: During actual application, the PCF entity may fail to determine that the connection has been established between the group member device and the group control device, and therefore, the group member device may send the indication information to the PCF entity, to notify the PCF entity that the connection has been established between the group member device and the group control device.

More The identifier of the group member device may be similar to the identifier of the group member device in step 1102 above, and details are not described herein again.

1203: The PCF entity sends a V2X communication parameter request message to a UDR.

1204: The UDR sends a V2X communication parameter to the PCF entity.

Steps 1203 and 1204 in an embodiment are similar to steps 1103 and 1104 above, and details are not described herein again.

1205: The PCF entity triggers a policy update.

Because the indication information received by the PCF entity is sent by the group member device, the PCF entity needs to trigger the policy update of the group control device, to send the V2X communication parameter of the group member device to an access network device corresponding to the group control device.

It should be noted that the procedure in an embodiment is performed in the scenario in which the group member device and the group control device correspond to the same PCF entity. Based on a determination that the group member device and the group control device correspond to different PCF entities, the PCF entity corresponding to the group member device receives the indication information sent by the group member device, then obtains the V2X communication parameter of the group member device from the UDR, and sends the V2X communication parameter to the PCF entity corresponding to the group control device. The PCF entity corresponding to the group control device performs the following steps 1206 to 1214. The identifier of the group member device may be sent to the PCF entity corresponding to the group control device, and the PCF entity corresponding to the group control device obtains the V2X communication parameter of the group member device from the UDR, and performs the following steps 1206 to 1214.

In addition, if the group member device and the group control device correspond to the same PCF entity, the PCF entity may trigger the policy update of the group control device or may not trigger the policy update of the group control device. Therefore, step 1205 in an embodiment is an optional step. The order may be adjusted based on an actual application scenario.

1206: The PCF entity sends the V2X communication parameter to the access network device.

1207: The access network device stores the V2X communication parameter.

Steps 1206 and 1207 in an embodiment are similar to steps 1105 and 1106 above, and details are not described herein again.

1208: The PCF entity sends a response message to the group member device.

After sending the V2X communication parameter of the group member device to the access network device corresponding to the group control device, the PCF entity may further feed back the response message to the group member device for the indication information sent by the group member device.

In an embodiment, the response message may carry an indication indicating that the group member device successfully joins group communication. This may be understood as that the PCF entity may notify the group member device that the PCF entity has determined that the connection has been established between the group member device and the group control device. The PCF entity may alternatively not send the response message to the group member device. Step 1208 in an embodiment is an optional step. The order may be adjusted based on an actual application scenario.

In an embodiment, if the PCF entity further allocates a group member identification number to the group member device, the response message further carries the group member identification number of the group member device. The group member device may use the group member identification number when requesting a PC5 resource.

1209: The group member device sends a PC5 resource request message to the group control device.

1210: The group control device sends the PC5 resource request message to the access network device.

1211: The access network device performs authorization check.

1212: The access network device allocates the PC5 resource.

1213: The access network device sends information about the PC5 resource to the group control device.

1214: The group control device sends the information about the PC5 resource to the group member device.

Steps 1209 to 1214 in an embodiment are similar to steps 1108 to 1113 above, and details are not described herein again.

In an embodiment, the group member device may directly send the indication information to the PCF entity. Then, the PCF entity triggers the policy update of the group control device, to send the V2X communication parameter of the group member device to the access network device. The access network device stores the V2X communication parameter of the group member device for the group control device. Therefore, when the group control device requests the PC5 resource for the group member device, the access network device may allocate the PC5 resource to the group member device based on the stored V2X communication parameter of the group member device, so that the group member device can perform communication on the PC5 resource allocated by the access network device.

Figure 13:
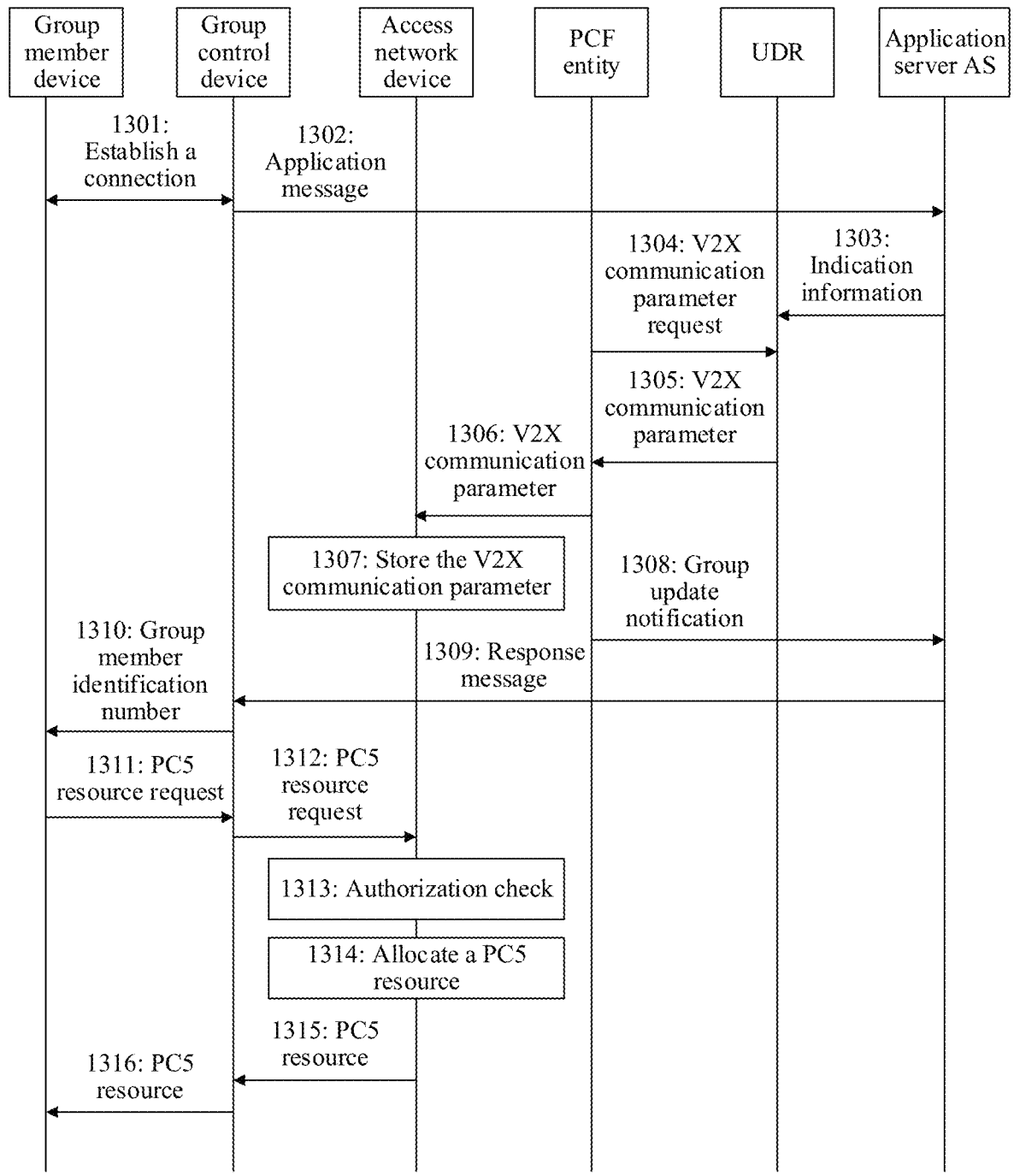
FIG. 13 is another schematic flowchart of a data processing method according to this application.

Scenario 3: Refer to FIG. 13. FIG. 13 is a schematic diagram of an embodiment of a data processing method according to the embodiments. The method may include the following steps.

1301: A group member device establishes a connection to a group control device.

Step 1301 in an embodiment is similar to step 601 above, and details are not described herein again.

1302: The group control device sends an application message to an application server AS.

The group control device may send the application message to a V2X application server (AS), where the application message may include an identifier of the group member device. Optionally, the application message further includes one or more of an identifier of the group control device, a group identifier, a group member joining indication, or the like. The foregoing identifiers are an identifier of the group member device and an identifier of the group control device that are recognizable to a 3GPP network. The AS directly obtains the identifiers and then sends the identifiers to a PCF entity in step 1303. The AS may be an AS corresponding to a V2X service and may provide the V2X service for the group control device.

For example, the connection may be established between the group member device and the group control device by using an application (APP). Therefore, the group control device may send an APP message, namely, the application message, to the AS.

In an embodiment, the group control device may send the application message to the AS corresponding to the V2X service, where the application message may include an identifier of the group member device at an application layer. Optionally, the application message further includes one or more of an identifier of the group control device at the application layer, a group identifier at the application layer, a group member joining indication at the application layer, or the like.

For example, the AS may store a relationship between the identifier of the group member device at the application layer and the identifier that is of the group member device and that is recognizable to the 3GPP network and a relationship between the identifier of the group control device at the application layer and the identifier that is of the group control device and that is recognizable to the 3GPP network. In this case, the AS obtains the identifier that is of the group member device and that is recognizable to the 3GPP network and the identifier that is of the group control device and that is recognizable to the 3GPP network based on the identifier of the group member device at the application layer, the identifier of the group control device at the application layer, the relationship between the identifier of the group member device at the application layer and the identifier that is of the group member device and that is recognizable to the 3GPP network, and the relationship between the identifier of the group control device at the application layer and the identifier that is of the group control device and that is recognizable to the 3GPP network, and sends the identifier that is of the group member device and that is recognizable to the 3GPP network and the identifier that is of the group control device and that is recognizable to the 3GPP network to the PCF entity through step 1303. Optionally, the AS further includes a relationship between the group identifier at the application layer and the group identifier recognizable to the 3GPP network. The AS obtains the group identifier recognizable to the 3GPP network, and sends the group identifier to the PCF entity through step 1303.

In an embodiment, the AS may directly send the identifier of the group control device at the application layer and the identifier of the group member device at the application layer to the PCF entity through step 1303. For example, the PCF entity may store the relationship between the identifier of the group member device at the application layer and the identifier that is of the group member device and that is recognizable to the 3GPP network and the relationship between the identifier of the group control device at the application layer and the identifier that is of the group control device and that is recognizable to the 3GPP network. In this case, the PCF entity may obtain the identifier that is of the group member device and that is recognizable to the 3GPP network and the identifier that is of the group control device and that is recognizable to the 3GPP network based on the identifier of the group member device at the application layer, the identifier of the group control device at the application layer, the relationship between the identifier of the group member device at the application layer and the identifier that is of the group member device and that is recognizable to the 3GPP network, and the relationship between the identifier of the group control device at the application layer and the identifier that is of the group control device and that is recognizable to the 3GPP network.

Optionally, the PCF entity further includes the relationship between the group identifier at the application layer and the group identifier recognizable to the 3GPP network. The AS directly sends the group identifier at the application layer to the PCF entity through step 1303, and the PCF entity obtains the group identifier recognizable to the 3GPP network.

In an embodiment, a group member joining indication sent by the AS to the PCF entity may be different from the group member joining indication received from the group control device, but is a new group member joining indication generated based on the group member joining indication received from the group control device.

The identifier of the group member device may be a common identification number of the group member device, for example, a SUPI, a SUCI, or a GUTI; or may be a group member identification number allocated by the group control device or the PCF entity. If being allocated by the group control device or the PCF entity, the group member identification number may be randomly allocated, or may be allocated according to a preset rule. The preset rule may include: A length of the group member identification number is a preset value; the group member identification number is obtained through arrangement performed in a preset sequence; or there is another preset rule. Optionally, the identifier of the group member device may alternatively include both the common identification number of the group member device and the group member identification number.

In an embodiment, if the identifier of the group member device includes the group member identification number, the group member identification number may be directly allocated by the group control device and then included in indication information. The group member identification number may alternatively be sent by the PCF entity to the group control device and/or the group member device before the group control device sends the indication information, so that the indication information may carry the group member identification number. This may be adjusted based on an actual application scenario, and is not limited in this application.

In an embodiment, the indication information may not carry the group member identification number, and the PCF entity allocates the group member identification number to the group member device after receiving the indication information.

1303: The AS sends the indication information to the PCF entity.

After receiving the application message, the AS obtains at least one of the identifier of the group control device, the identifier of the group member device, the group identifier, the group member joining indication, or the like included in the application message, then generates the indication information, and sends the indication information to the PCF entity.

For the identifier of the group member device and/or the identifier of the group control device that are/is included in the indication information, refer to the descriptions in step 1302.

1304: The PCF entity sends a V2X communication parameter request to a UDR.

1305: The UDR sends a V2X communication parameter to the PCF entity.

1306: The PCF entity sends the V2X communication parameter to an access network device.

1307: The access network device stores the V2X communication parameter.

Steps 1304 to 1307 in an embodiment are similar to steps 603 to 606 above, and details are not described herein again.

1308: The PCF entity sends a group update notification message to the AS.

After sending the V2X communication parameter to the access network device, the PCF entity may send the group update notification message to the AS.

In an embodiment, if the PCF entity allocates the group member identification number, the group update notification message may include the group member identification number of the group member device. Optionally, for a response to the group member joining indication included in the indication information, the group update notification message includes an indication indicating that the group member device successfully joins.

1309: The AS sends a response message to the group control device.

After the AS receives the group update notification message sent by the PCF entity, if the group update notification message includes the group member identification number of the group member device and/or the response to the group member joining indication, the AS may obtain the group member identification number of the group member device and the response to the group member joining indication included in the indication information, and generate the response message for the application message.

In an embodiment, the response message may include the response to the group member joining indication and at least one of the group identifier or the identifier of the group member device.

In an embodiment, the identifier of the group member device may include the common identification number of the group member device, for example, the SUPI, the SUCI, or the GUTI, or may include the group member identification number. The group member identification number may be allocated by the group control device, or may be allocated by the PCF entity. Alternatively, the identifier of the group member device is the identifier of the group member device at the application layer.

During actual application, if the group member identification number is allocated by the group control device, the group member identification number may be carried in the application message. If the group member identification number is allocated by the PCF entity, the group member identification number may be carried in the response message, to notify the group control device of the group member identification number allocated by the PCF entity to the group member device.

It should be noted that steps 1308 and 1309 in an embodiment are optional steps.

1310: The group control device sends the group member identification number to the group member device.

1311: The group member device sends a PC5 resource request message to the group control device.

1312: The group control device sends the PC5 resource request message to the access network device.

1313: The access network device performs authorization check.

1314: The access network device allocates a PC5 resource.

1315: The access network device sends information about the PC5 resource to the group control device.

1316: The group control device sends the information about the PC5 resource to the group member device.

Steps 1310 to 1316 in an embodiment are similar to steps 1108 to 1113 above, and details are not described herein again.

In an embodiment, the group member device may send the application message to the AS, and then the AS sends the indication information to the PCF entity. After receiving the indication information, the PCF entity obtains the V2X communication parameter of the group member device from the UDR and sends the V2X communication parameter of the group member device to the access network device. The access network device stores the V2X communication parameter of the group member device for the group control device. Therefore, based on a determination that the group control device requests the PC5 resource for the group member device, the access network device may allocate the PC5 resource to the group member device based on the stored V2X communication parameter of the group member device, so that the group member device can perform communication on the PC5 resource allocated by the access network device.

Figure 14:
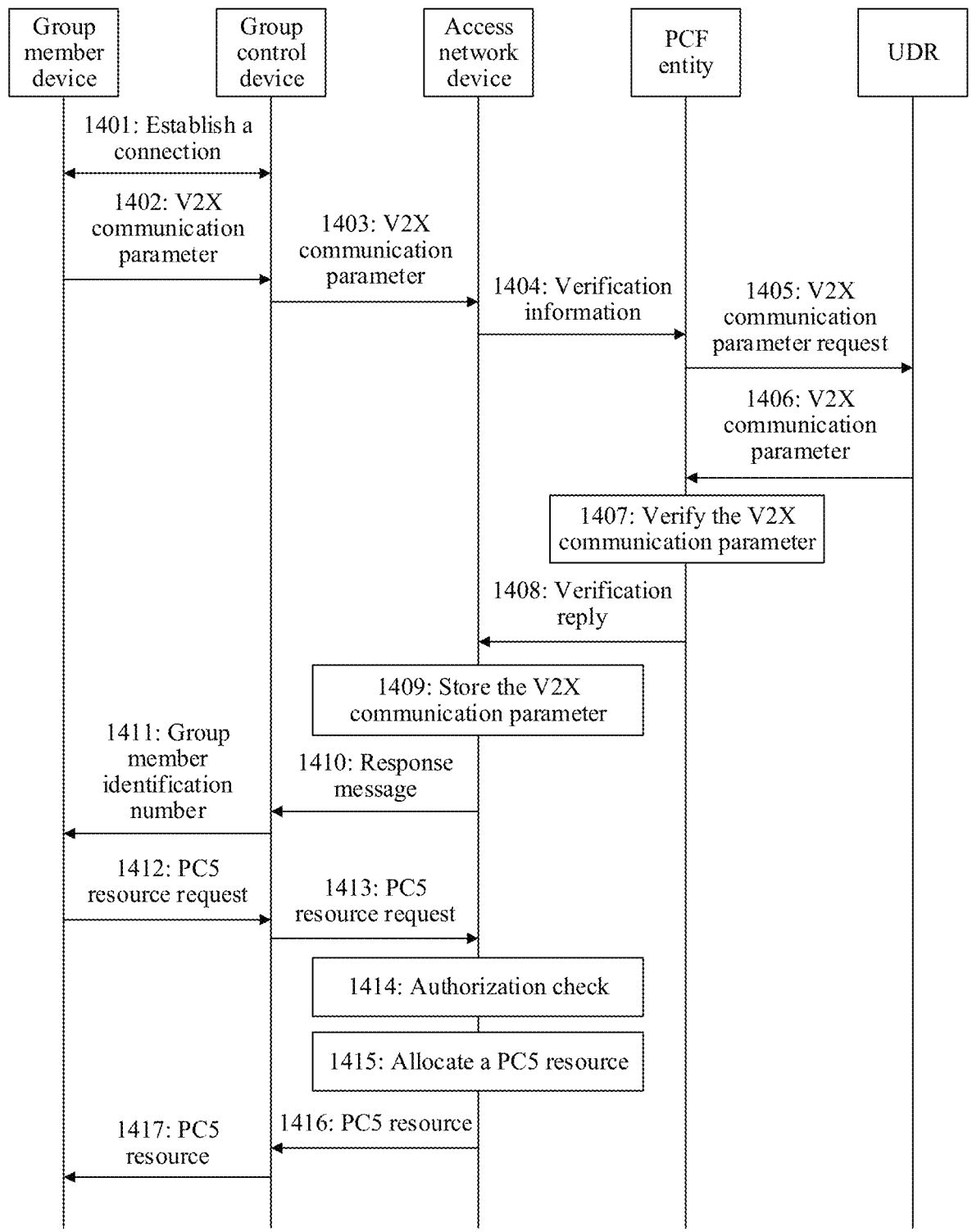
FIG. 14 is another schematic flowchart of a data processing method according to this application.

Scenario 4: Refer to FIG. 14. FIG. 14 is a schematic diagram of an embodiment of a data processing method according to the embodiments. The method may include the following steps.

1401: A group member device establishes a connection to a group control device.

Step 1401 in an embodiment is similar to step 601 above, and details are not described herein again.

1402: The group member device sends a V2X communication parameter to the group control device.

The group member device has stored the V2X communication parameter and sends the stored V2X communication parameter to the group control device. For descriptions of the V2X communication parameter, refer to step 401 above.

The V2X communication parameter may be sent by a PCF entity corresponding to the group member device to the group member device in advance or may be sent by another network device to the group member device. This may be adjusted based on an actual application scenario.

In addition, the V2X communication parameter may be actively sent by the group member device to the group control device after the group member device establishes the connection to the group control device or may be sent by the group member device to the group control device at the request of the group control device. This may be adjusted based on an actual application scenario and is not limited in this application.

1403: The group control device sends the V2X communication parameter to an access network device.

After receiving the V2X communication parameter sent by the group member device, the group control device sends the V2X communication parameter to the access network device.

Based on a determination that the V2X communication parameter is sent, the V2X communication parameter may be sent in a same message as an identifier of the group control device, an identifier of the group member device, a group identifier, or the like, so that the access network device can identify the group member device that has established the connection to the group control device.

In an embodiment, the group control device may send the V2X communication parameter of the group member device to the access network device by using an RRC message.

1404: The access network device sends verification information to the PCF entity.

After receiving the V2X communication parameter sent by the group control device, the access network device further verifies the V2X communication parameter through the PCF entity. Therefore, the access network device sends the verification information to the PCF entity, to verify the V2X communication parameter sent by the group control device.

The PCF entity may obtain a correct V2X communication parameter of the group member device, and then compare the correct V2X communication parameter with the V2X communication parameter sent by the access network device, to determine whether the V2X communication parameter sent by the access network device is correct.

The verification information may include the V2X communication parameter sent by the group control device, and may further include the group identifier, the identifier of the group member device, or the like.

The identifier of the group member device may include an identification number of the group member device, for example, a SUPI, a SUCI, or a GUTI, or may include a group member identification number. The group member identification number may be allocated by the group control device, or may be allocated by the PCF entity.

During actual application, if the group member identification number is allocated by the group control device, the group member identification number may be carried in the verification information. If the group member identification number is allocated by the PCF entity, the verification information may not carry the group member identification number. Optionally, the group member identification number is carried in a verification reply information, to notify the group control device of the group member identification number allocated by the PCF entity to the group member device.

In addition to sending the verification information, the access network device may alternatively send indication information, where the indication information may include the identifier of the group control device, the identifier of the group member device, the group identifier, or the like, and may further include a group member joining indication. The indication information is similar to the indication information in steps 1102, 1202, and 1303 above, and details are not described herein again.

1405: The PCF entity sends a V2X communication parameter request to a UDR.

1406: The UDR sends the V2X communication parameter to the PCF entity.

Steps 1405 and 1406 in an embodiment are similar to steps 1103 and 1104 above, and details are not described herein again.

1407: The PCF entity verifies the V2X communication parameter.

In this step, for clearer differentiation, the V2X communication parameter sent by the group control device is referred to as a first V2X communication parameter, and the V2X communication parameter sent by the UDR to the PCF entity is referred to as a second V2X communication parameter.

After obtaining the first V2X communication parameter sent by the group control device and the second V2X communication parameter sent by the UDR, the PCF entity compares the first V2X communication parameter with the second V2X communication parameter; and if the first V2X communication parameter matches the second V2X communication parameter, the PCF entity determines that the first V2X communication parameter is successfully verified.

Based on a determination, by the PCF entity, that the first V2X communication parameter is the same as the second V2X communication parameter, the PCF entity determines that the first V2X communication parameter is successfully verified. If the PCF entity determines that the first V2X communication parameter is different from the second V2X communication parameter, the PCF entity determines that the first V2X communication parameter fails to be verified.

1408: The PCF entity sends the verification reply message to the access network device.

After successfully verifying the V2X communication parameter sent by the access network device, the PCF entity sends the verification reply message to the access network device. The verification reply message itself represents whether the verification succeeds, or the verification reply message may carry indication data indicating whether the verification succeeds. After receiving the verification reply message, the access network device may determine, based on the verification reply message, whether the V2X communication parameter is successfully verified.

In an embodiment, the verification reply message may further carry the identifier of the group member device. The identifier of the group member device may include the identification number of the group member device, for example, the SUPI, the SUCI, or the GUTI, or may include the group member identification number. The group member identification number may be allocated by the group control device, or may be allocated by the PCF entity.

In an embodiment, if the group member identification number is allocated by the group control device, the group member identification number may be carried in the verification information. If the group member identification number is allocated by the PCF entity, the group member identification number may be carried in the verification reply information, to notify the group control device of the group member identification number allocated by the PCF entity to the group member device.

1409: The access network device stores the V2X communication parameter.

After determining, based on the verification reply message, that the V2X communication parameter is successfully verified, the access network device may store the V2X communication parameter.

Step 1409 in an embodiment is similar to step 1106 above, and details are not described herein again.

1410: The access network device sends a response message to the group control device.

After determining, based on the verification reply message, that the V2X communication parameter is successfully verified, the access network device may send the response message to the group control device, where the response message indicates that the verification succeeds or indicates that the access network device can allocate a PC5 resource to the group member device.

A sequence of performing step 1409 and step 1410 is not limited in an embodiment. Step 1409 may be first performed, step 1410 may be first performed, or step 1409 and step 1410 may be simultaneously performed. This may be adjusted based on an actual application scenario, and is not limited herein.

It should be noted that step 1410 in an embodiment is an optional step.

1411: The group control device sends the group member identification number to the group member device.

1412: The group member device sends a PC5 resource request message to the group control device.

1413: The group control device sends the PC5 resource request message to the access network device.

1414: The access network device performs authorization check.

1415: The access network device allocates the PC5 resource.

1416: The access network device sends information about the PC5 resource to the group control device.

1417: The group control device sends the information about the PC5 resource to the group member device.

Steps 1411 to 1417 in an embodiment are similar to steps 1107 to 1113 above, and details are not described herein again.

In an embodiment, the V2X communication parameter may be sent by the group control device to the access network device, and the access network device may verify the V2X communication parameter through the PCF entity. After the verification succeeds, the V2X communication parameter may be stored in a context of the group control device. Therefore, when the group control device requests the PC5 resource for the group member device, the access network device may allocate the PC5 resource to the group member device based on the stored V2X communication parameter of the group member device, so that the group member device can perform communication on the PC5 resource allocated by the access network device.

Figure 15:
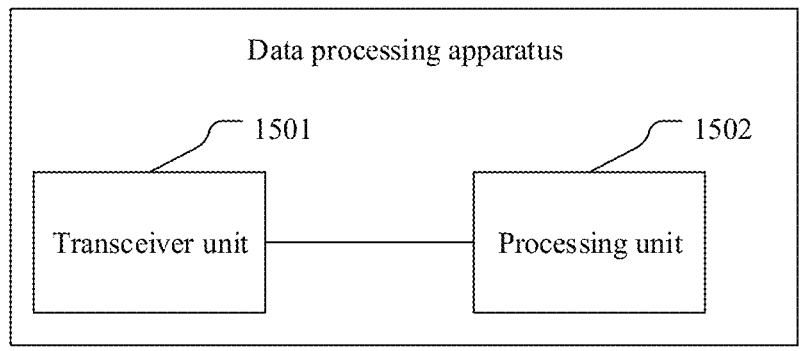
FIG. 15 is a schematic diagram of a structure of a data processing apparatus according to this application.

The foregoing describes in detail the methods provided in this application. The following describes, based on the foregoing methods, data processing apparatuses provided in the embodiments. Refer to FIG. 15. FIG. 15 shows an embodiment of a data processing apparatus in the embodiments. The data processing apparatus may be an access network device or a chip or chip system located in the access network device. The data processing apparatus may be configured to perform the steps performed by the access network device in the embodiments shown in FIG. 4 to FIG. 14. For details, refer to the related descriptions in the foregoing method embodiments.

The data processing apparatus includes a transceiver unit 1501 and a processing unit 1502.

The transceiver unit 1501 is configured to receive a vehicle-to-everything V2X communication parameter of a group member device.

The processing unit 1502 is configured to store the V2X communication parameter in a context of a group control device in a group to which the group member device belongs, where the V2X communication parameter is used for allocating a PC5 resource to the group member device.

In a an embodiment,
the processing unit 1502 is further configured to allocate the PC5 resource to the group member device based on the V2X communication parameter; and
the transceiver unit 1501 is further configured to send information about the PC5 resource to the group control device.

In a an embodiment,
the transceiver unit 1501 is configured to receive the V2X communication parameter from a policy control function PCF entity.

In a an embodiment,
the transceiver unit 1501 is configured to receive the V2X communication parameter from the group control device.

In an embodiment, after the transceiver unit 1501 receives the V2X communication parameter from the group control device,
the transceiver unit 1501 is further configured to send verification information to the PCF entity, where the verification information is used to verify the V2X communication parameter;
the transceiver unit 1501 is further configured to receive verification reply information from the PCF entity; and
the processing unit 1502 is configured to store the V2X communication parameter when the verification reply information is used to indicate that the V2X communication parameter is successfully verified.

In an embodiment, the verification information includes the V2X communication parameter and an identifier of the group member device.

In an embodiment,
the transceiver unit 1501 is further configured to send indication information of the group control device to the PCF entity, where the indication information is used to indicate that a connection has been established between the group member device and the group control device.

In an embodiment,
the transceiver unit 1501 is configured to receive a radio resource control RRC message from the group control device, where the RRC message includes the V2X communication parameter.

In an embodiment, before the access network device allocates the PC5 resource to the group member device based on the V2X communication parameter,
the transceiver unit 1501 is further configured to receive a PC5 resource request message from the group control device, where the PC5 resource request message is used to request to allocate the PC5 resource to the group member device; and
the processing unit 1502 is configured to allocate the PC5 resource to the group member device based on the PC5 resource request message and the V2X communication parameter.

In an embodiment,
the processing unit 1502 is configured to perform authorization check on the group member device based on the V2X communication parameter;
the processing unit 1502 is configured to allocate the PC5 resource to the group member device when the group member device is successfully authorized; and
the transceiver unit 1501 is further configured to send information about the PC5 resource to the group control device.

In an embodiment, the PC5 resource request message includes at least one of a group member identification number of the group member device, a PC5 quality of service identifier PQI of the group member device, a PC5 QoS flow identifier of the group member device, or a data volume of the group member device.

In an embodiment,
the transceiver unit 1501 is further configured to: before receiving the PC5 resource request message from the group control device, receive the group member identification number of the group member device.

In an embodiment, before the access network device receives the PC5 resource request message from the group control device,
the processing unit 1502 is further configured to allocate the group member identification number to the group member device; and
the transceiver unit 1501 is further configured to send the group member identification number to the group control device.

In an embodiment, the V2X communication parameter includes at least one of the following: V2X authorization information of the group member device or a PC5 quality of service QoS parameter of the group member device.

In an embodiment, the access network device may receive the V2X communication parameter, and store the V2X communication parameter for the group control device, where the V2X communication parameter may be used to subsequently allocate the PC5 resource to the group member device. The access network device may allocate the PC5 resource to the group member device based on the V2X communication parameter of the group member device, so that the group member device can perform normal communication of a V2X service on the allocated PC5 resource.

Figure 16:
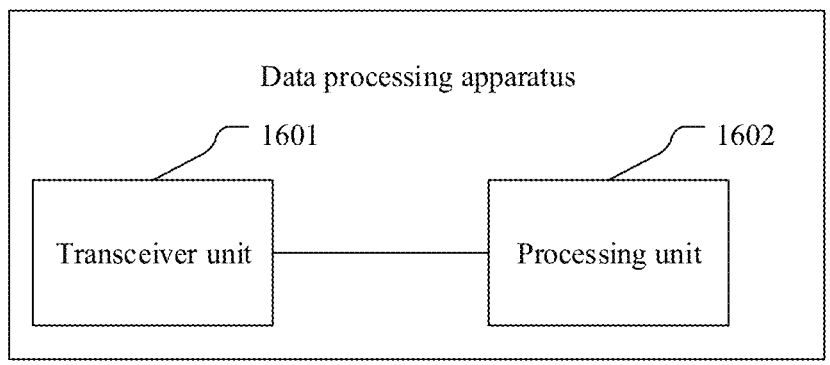
FIG. 16 is another schematic diagram of a structure of a data processing apparatus according to this application.

Refer to FIG. 16. An embodiment provides another data processing apparatus. The data processing apparatus may be a PCF entity or a chip or chip system located in the PCF entity. The data processing apparatus may be configured to perform the steps performed by the PCF entity in the embodiments shown in FIG. 4 to FIG. 14. For details, refer to the related descriptions in the foregoing method embodiments.

The data processing apparatus may include a transceiver unit 1601.

Optionally, the data processing apparatus may further include a processing unit 1602.

The transceiver unit 1601 is configured to obtain a V2X communication parameter of a group member device.

The transceiver unit 1601 is further configured to send the V2X communication parameter to an access network device accessed by a group control device in a group to which the group member device belongs.

In an embodiment,
the transceiver unit 1601 is further configured to receive indication information before obtaining the V2X communication parameter of the group member device, where the indication information is used to indicate that a connection has been established between the group member device and the group control device; and
the transceiver unit 1601 is further configured to obtain the V2X communication parameter of the group member device based on the indication information.

In an embodiment,
the transceiver unit 1601 is further configured to obtain the locally stored V2X communication parameter based on the indication information, or receive the V2X communication parameter from a unified data repository UDR network element based on the indication information.

In an embodiment,
the transceiver unit 1601 is configured to: receive the indication information from an application server AS, receive the indication information from the group control device, receive the indication information from the group member device, or receive the indication information from the access network device.

In an embodiment,
the processing unit 1602 is configured to perform authorization check on the group member device based on the V2X communication parameter; and
the processing unit 1602 is further configured to associate the group member device with the group control device when the group member device is successfully authorized.

In an embodiment,
the transceiver unit 1601 is further configured to send the V2X communication parameter to the group control device, so that the group control device stores the V2X communication parameter.

In an embodiment,
the transceiver unit 1601 is further configured to receive a group member identification number of the group member device from the group control device;

the transceiver unit 1601 is further configured to receive a group member identification number of the group member device from the group member device; or
the processing unit 1602 is configured to allocate a group member identification number to the group member device.

In an embodiment,
the transceiver unit 1601 is further configured to send the group member identification number to the access network device.

In an embodiment,
after the PCF entity allocates the group member identification number to the group member device, the transceiver unit 1601 is further configured to: send the group member identification number to the group member device, send the group member identification number to the group control device, or send the group member identification number to the AS.

In an embodiment, the V2X communication parameter includes at least one of the following: V2X authorization information or a PC5 quality of service QoS parameter of the group member device.

In an embodiment,
if the V2X communication parameter of the group member device is sent by the group control device to the access network device, the transceiver unit 1601 is further configured to receive verification information from the group member device, where the verification information is used to verify the V2X communication parameter of the group member device;
the transceiver unit 1601 is further configured to send a request message to a UDR based on the verification information, where the request message is used to request the V2X communication parameter; and
the transceiver unit 1601 is further configured to receive a V2X communication parameter of the group member device from the unified data repository UDR network element. In an embodiment, if the group control device sends the V2X communication parameter of the group member device to the access network device, the PCF entity may verify the V2X communication parameter, to determine that the access network device has stored the correct V2X communication parameter.

In an embodiment, if the processing unit 1602 successfully verifies the V2X communication parameter of the group member device, the processing unit 1602 is further configured to generate verification reply information, where the verification reply information indicates that the V2X communication parameter is successfully verified; and
the transceiver unit 1601 is further configured to send the verification reply information to the access network device, to notify the access network device that the V2X communication parameter is successfully verified, so that the access network device can store the correct V2X communication parameter of the group member device.

In an embodiment, the PCF entity may obtain the V2X communication parameter of the group member device, and send the V2X communication parameter to the access network device accessed by the group control device. In this way, the access network device may store the V2X communication parameter in a context of the group control device, so that the access network device may allocate a PC5 resource to the group member device based on the stored V2X communication parameter of the group member device.

Figure 17:
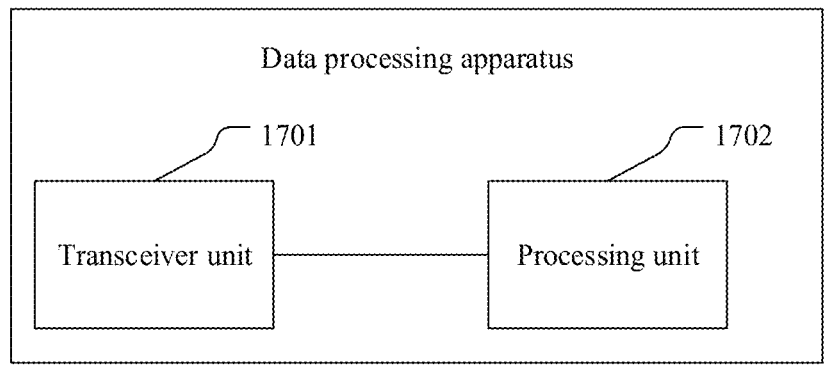
FIG. 17 is another schematic diagram of a structure of a data processing apparatus according to this application.

Refer to FIG. 17. An embodiment provides another data processing apparatus. The data processing apparatus may be a terminal or a chip or chip system located in the terminal. The data processing apparatus may be configured to perform the steps performed by the group control device in the embodiments shown in FIG. 4 to FIG. 14. For details, refer to the related descriptions in the foregoing method embodiments.

The data processing apparatus includes a transceiver unit 1701 and a processing unit 1702.

The processing unit 1702 is configured to establish a connection to a group member device.

The transceiver unit 1701 is configured to send indication information to a PCF entity, where the indication information is used to indicate that the connection has been established between the data processing apparatus and the group member device.

In an embodiment,
the transceiver unit 1701 is configured to send the indication information to the PCF via an application server AS.

In an embodiment,
the transceiver unit 1701 is further configured to receive a PC5 resource request message from the group member device;
the transceiver unit 1701 is further configured to send the PC5 resource request message to an access network device;
the transceiver unit 1701 is further configured to receive, from the access network device, information about a PC5 resource allocated to the group member device; and
the processing unit 1702 is further configured to allocate the PC5 resource to the group member device based on the information about the PC5 resource.

In an embodiment,
the transceiver unit 1701 is further configured to receive a V2X communication parameter from the PCF entity; and
the processing unit 1702 is further configured to store the V2X communication parameter.

In an embodiment,
the transceiver unit 1701 is configured to send the PC5 resource request message to the access network device when the processing unit 1702 determines, based on the V2X communication parameter of the group member device, that the group member device is successfully authorized.

In an embodiment,
the transceiver unit 1701 is further configured to send a group member identification number to the group member device.

In an embodiment, before the group control device sends the group member identification number to the group member device,
the processing unit 1702 is further configured to allocate the group member identification number to the group member device;
the transceiver unit 1701 is further configured to receive the group member identification number from the PCF entity; or
the transceiver unit 1701 is further configured to receive the group member identification number from the access network device.

In an embodiment, the V2X communication parameter includes at least one of the following: V2X authorization information or a PC5 quality of service QoS parameter of the group member device.

In an embodiment, the connection may be established between the group control device and the group member device, and then the group control device sends the indication information to the PCF entity, to notify the PCF entity that the connection has been established between the group control device and the group member device. Then, the PCF entity may obtain the V2X communication parameter of the group member device based on the indication information, and send the V2X communication parameter to the access network device, so that the access network device stores the V2X communication parameter of the group member device in a context of the group control device, and may further allocate the PC5 resource to the group member device based on the stored V2X communication parameter.

Figure 18:
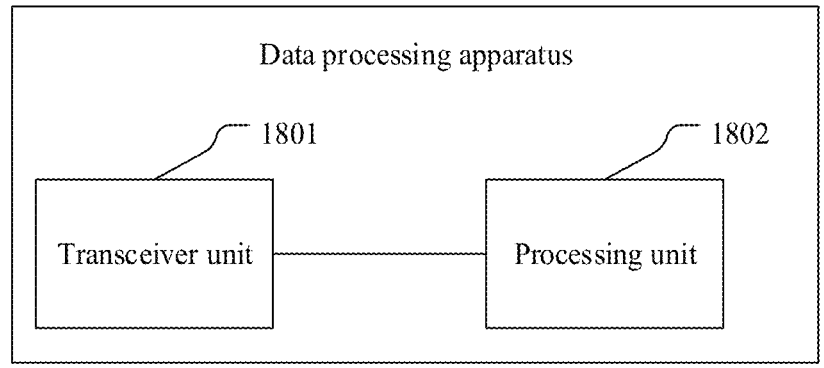
FIG. 18 is another schematic diagram of a structure of a data processing apparatus according to this application.

Refer to FIG. 18. An embodiment provides another data processing apparatus. The data processing apparatus may be a terminal or a chip or chip system located in the terminal. The data processing apparatus may be configured to perform the steps performed by the group control device in the embodiments shown in FIG. 4 to FIG. 14. For details, refer to the related descriptions in the foregoing method embodiments.

The data processing apparatus includes a transceiver unit 1801.

Optionally, the data processing apparatus further includes a processing unit 1802.

The transceiver unit 1801 is configured to receive a V2X communication parameter from a group member device.

The transceiver unit 1801 is further configured to send the V2X communication parameter to an access network device.

In an embodiment,
the transceiver unit 1801 is further configured to receive a PC5 resource request message from the group member device;
the transceiver unit 1801 is further configured to send the PC5 resource request message to the access network device;
the transceiver unit 1801 is further configured to receive, from the access network device, information about a PC5 resource allocated to the group member device; and
the processing unit 1802 is configured to allocate the PC5 resource to the group member device based on the information about the PC5 resource.

In an embodiment,
the transceiver unit 1801 is configured to send the PC5 resource request message to the access network device when the processing unit 1802 determines, based on the V2X communication parameter of the group member device and the PC5 resource request message, that the group member device is successfully authorized.

In an embodiment,
the transceiver unit 1801 is further configured to send a group member identification number to the group member device.

In an embodiment, before the group control device sends the group member identification number to the group member device,
the processing unit 1802 is further configured to allocate the group member identification number to the group member device;

the transceiver unit 1801 is further configured to receive the group member identification number from a PCF entity; or the transceiver unit 1801 is further configured to receive the group member identification number from the access network device.

In an embodiment, the V2X communication parameter includes at least one of the following: V2X authorization information or a PC5 quality of service QoS parameter of the group member device.

In an embodiment, after receiving the V2X communication parameter from the group member device, the group control device sends the V2X communication parameter to the access network device. In this way, the access network device may store the V2X communication parameter of the group member device, and allocate the PC5 resource to the group member device based on the V2X communication parameter.

Figure 19:
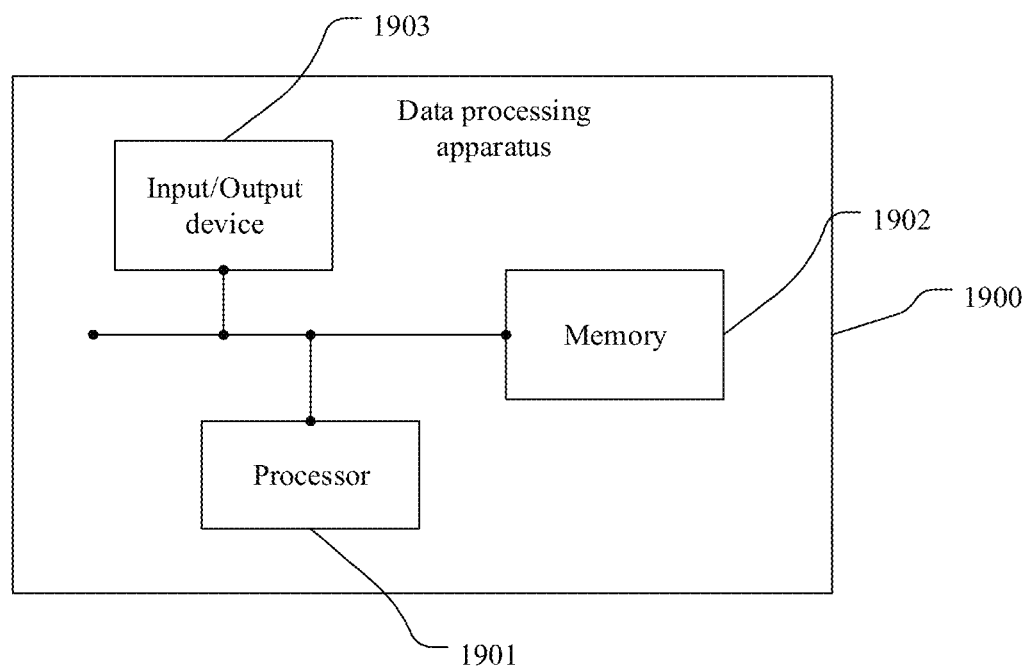
FIG. 19 is another schematic diagram of a structure of a data processing apparatus according to this application.

This application further provides a data processing apparatus 1900. Refer to FIG. 19. FIG. 19 shows an embodiment of a data processing apparatus in the embodiments. The data processing apparatus may be an access network device or a chip or chip system located in the access network device. The data processing apparatus may be configured to perform the steps performed by the access network device in any one of the embodiments shown in FIG. 4 to FIG. 14. For details, refer to the related descriptions in the foregoing method embodiments.

The data processing apparatus 1900 includes a processor 1901, a memory 1902, and an input/output device 1903.

In an embodiment, the processor 1901, the memory 1902, and the input/output device 1903 are separately connected to a bus, and the memory stores computer instructions.

The transceiver unit 1501 in the foregoing embodiment may be the input/output device 1903 in an embodiment. Therefore, an embodiment of the input/output device 1903 is not described again.

The processing unit 1502 in the foregoing embodiment may be the processor 1901 in an embodiment. Therefore, an embodiment of the processor 1901 is not described again.

In an embodiment, the data processing apparatus 1900 may include more or fewer components than that shown in FIG. 19. This is merely an example for description, and is not limited in this application.

Figure 20:
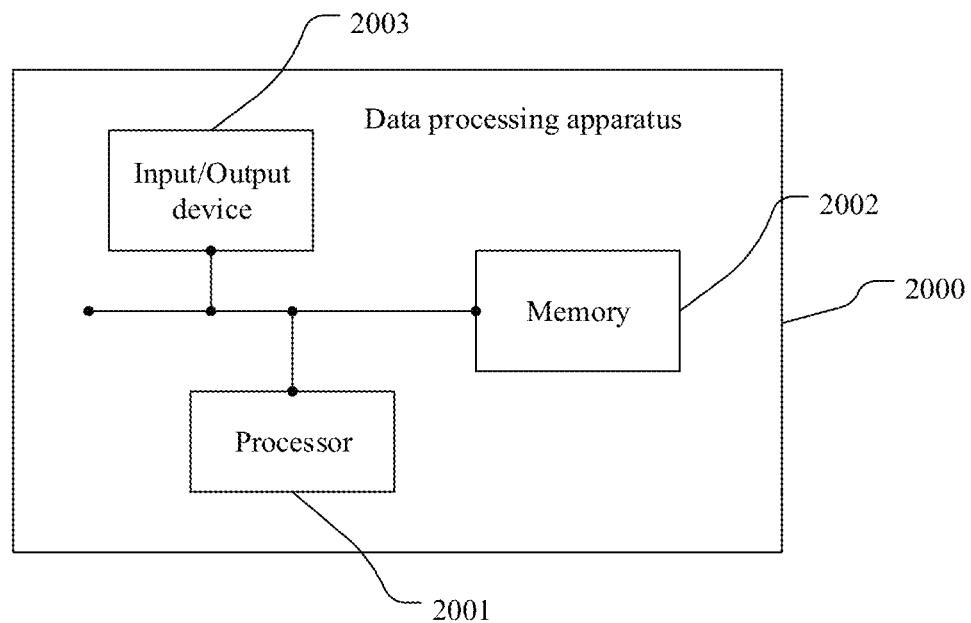
FIG. 20 is another schematic diagram of a structure of a data processing apparatus according to this application.

This application further provides a data processing apparatus 2000. Refer to FIG. 20. FIG. 20 shows an embodiment of a data processing apparatus in the embodiments. The data processing apparatus may be a PCF entity or a chip or chip system located in the PCF entity. The data processing apparatus may be configured to perform the steps performed by the PCF entity in any one of the embodiments shown in FIG. 4 to FIG. 14. For details, refer to the related descriptions in the foregoing method embodiments.

The data processing apparatus 2000 includes a processor 2001, a memory 2002, and an input/output device 2003.

In an embodiment, the processor 2001, the memory 2002, and the input/output device 2003 are separately connected to a bus, and the memory stores computer instructions.

The transceiver unit 1601 in the foregoing embodiment may be the input/output device 2003 in an embodiment. Therefore, an embodiment of the input/output device 2003 is not described again.

The processing unit 1602 in the foregoing embodiment may be the processor 2001 in an embodiment. Therefore, an embodiment of the processor 2001 is not described again.

In an embodiment, the data processing apparatus 2000 may include more or fewer components than that shown in FIG. 20. This is merely an example for description, and is not limited in this application.

Figure 21:
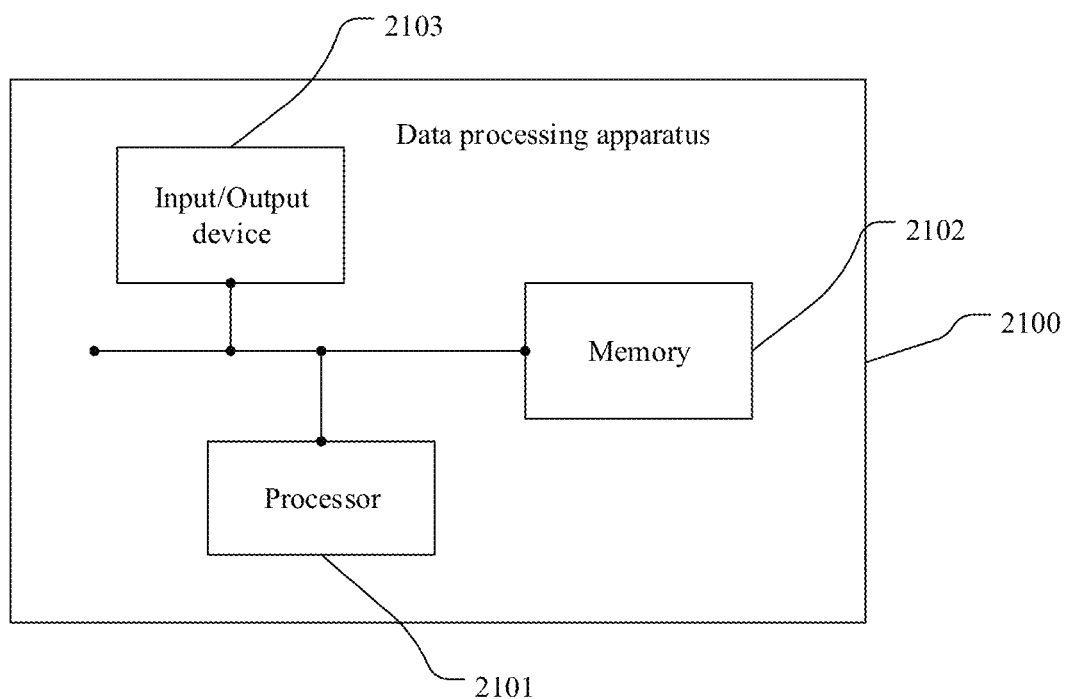
FIG. 21 is another schematic diagram of a structure of a data processing apparatus according to this application.

This application further provides a data processing apparatus 2100. Refer to FIG. 21. FIG. 21 shows an embodiment of a data processing apparatus in the embodiments. The data processing apparatus may be a group control device or a chip or chip system located in the group control device. The data processing apparatus may be configured to perform the steps performed by the group control device in any one of the embodiments shown in FIG. 4 to FIG. 14. For details, refer to the related descriptions in the foregoing method embodiments.

The data processing apparatus 2100 includes a processor 2101, a memory 2102, and an input/output device 2103.

In an embodiment, the processor 2101, the memory 2102, and the input/output device 2103 are separately connected to a bus, and the memory stores computer instructions.

The transceiver unit 1701 in the foregoing embodiment may be the input/output device 2103 in an embodiment. Therefore, an embodiment of the input/output device 2103 is not described again.

The processing unit 1702 in the foregoing embodiment may be the processor 2101 in an embodiment. Therefore, an embodiment of the processor 2101 is not described again.

In an embodiment, the data processing apparatus 2100 may include more or fewer components than that shown in FIG. 21. This is merely an example for description, and is not limited in this application.

Figure 22:
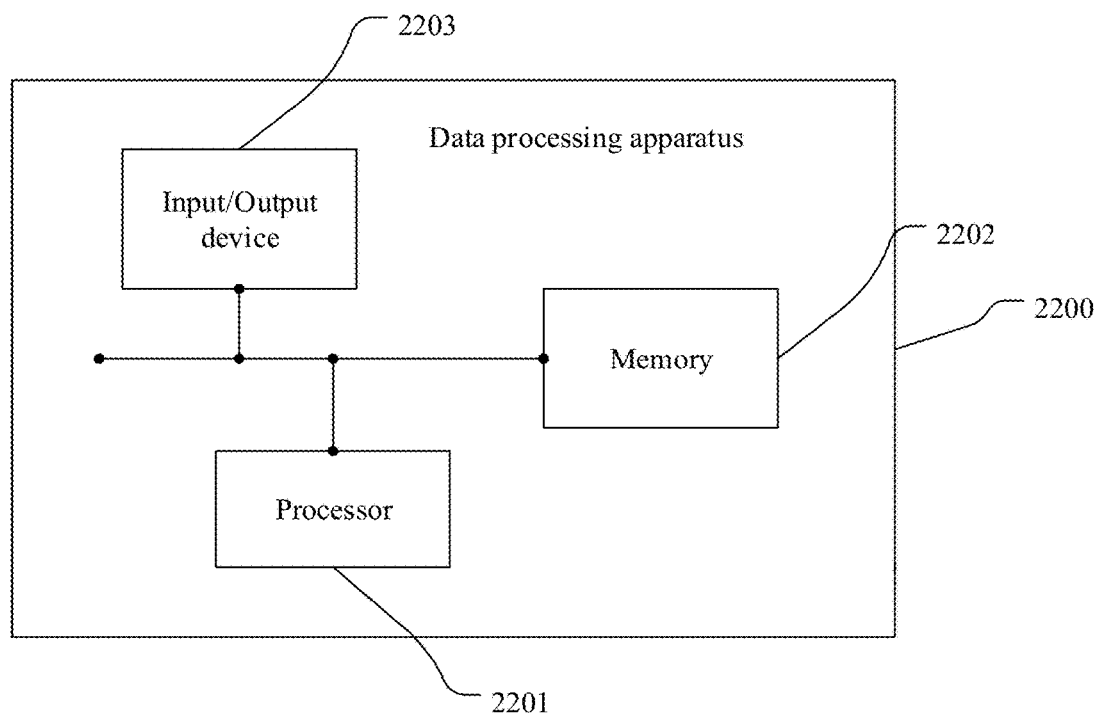
FIG. 22 is another schematic diagram of a structure of a data processing apparatus according to this application.

This application further provides a data processing apparatus 2200. Refer to FIG. 22. FIG. 22 shows an embodiment of a data processing apparatus in the embodiments. The data processing apparatus may be a group control device or a chip or chip system located in the group control device. The data processing apparatus may be configured to perform the steps performed by the group control device in any one of the embodiments shown in FIG. 4 to FIG. 14. For details, refer to the related descriptions in the foregoing method embodiments.

The data processing apparatus 2200 includes a processor 2201, a memory 2202, and an input/output device 2203.

In an embodiment, the processor 2201, the memory 2202, and the input/output device 2203 are separately connected to a bus, and the memory stores computer instructions.

The transceiver unit 1801 in the foregoing embodiment may be the input/output device 2203 in an embodiment. Therefore, an embodiment of the input/output device 2203 is not described again.

The processing unit 1802 in the foregoing embodiment may be the processor 2201 in an embodiment. Therefore, an embodiment of the processor 2201 is not described again.

In an embodiment, the data processing apparatus 2200 may include more or fewer components than that shown in FIG. 22. This is merely an example for description, and is not limited in this application.

Figure 23:
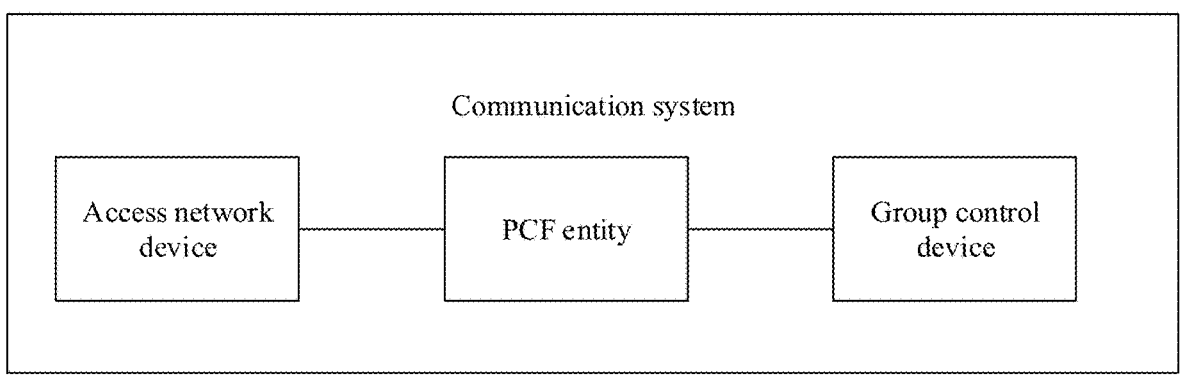
FIG. 23 is a schematic diagram of a structure of a communication system according to this application.

Refer to FIG. 23. An embodiment further provides a communication system. The communication system includes an access network device, a PCF entity, and a group control device.

The access network device may include the data processing apparatus shown in FIG. 15, and is configured to perform all or a part of the steps performed by the access network device in any one of the embodiments shown in FIG. 4 to FIG. 14.

The PCF entity may include the data processing apparatus shown in FIG. 16, and is configured to perform all or a part of the steps performed by the PCF entity in any one of the embodiments shown in FIG. 4 to FIG. 14.

The group control device may include the data processing apparatus shown in FIG. 17 and/or FIG. 18, and is configured to perform all or a part of the steps performed by the group control device in any one of the embodiments shown in FIG. 4 to FIG. 14.

In an embodiment, the communication system may further include a group member device, and the group member device may be configured to perform all or a part of the steps performed by the group member device in any one of the embodiments shown in FIG. 4 to FIG. 14.

This application provides a chip system. The chip system includes a processor, configured to support a data processing apparatus in implementing functions in the foregoing aspects, for example, sending or processing data and/or information in the foregoing methods. In an embodiment, the chip system further includes a memory, where the memory is configured to store program instructions and data. The chip system may include a chip, or may include a chip and another discrete component.

In an embodiment, when the data processing apparatus is a chip in a group control device, a PCF entity, an access network device, or the like, the chip includes a processing unit and a communication unit. The processing unit may be, for example, a processor. The communication unit may be, for example, an input/output interface, a pin, or a circuit. The processing unit may execute computer-executable instructions stored in a storage unit, so that the chip in the terminal, the base station, or the like performs the steps of the method performed by the group control device, the PCF entity, or the access network device in any one of the embodiments in FIG. 4 to FIG. 14. Optionally, the storage unit is a storage unit in the chip, for example, is a register or a buffer. Alternatively, the storage unit may be a storage unit that is in the terminal, the base station, or the like but is outside the chip, for example, may be a read-only memory (ROM), another type of static storage device that can store static information and instructions, or a random access memory (RAM).

An embodiment further provides a computer-readable storage medium, and the computer-readable storage medium stores a computer program. When the computer program is executed by a computer, a method procedure related to a data processing apparatus in any one of the foregoing method embodiments is implemented. Correspondingly, the computer may be the data processing apparatus above. The data processing apparatus includes an access network device, a group control device, or a PCF entity.

An embodiment further provides a computer program or a computer program product including the computer program. When the computer program is executed on a computer, the computer is enabled to implement a method procedure related to a data processing apparatus in any one of the foregoing method embodiments. Correspondingly, the computer may be the data processing apparatus above.

All or some of the embodiments in FIG. 4 to FIG. 14 may be implemented by using software, hardware, firmware, or any combination thereof. When software is used to implement the embodiments, all or some of the embodiments may be implemented in a form of a computer program product.

The computer program product includes one or more computer instructions. When the computer program instructions are loaded and executed on a computer, the procedures or functions according to the embodiments are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible to the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

It should be understood that, the processor mentioned in this application may be a central processing unit (CPU), or the processor may be another general-purpose processor, a digital signal processor (DSP), an application-specific integrated circuit (ASIC), a field programmable gate array (FPGA) or another programmable logic device, a discrete gate, a transistor logic device, a discrete hardware component, or the like. The general-purpose processor may be a microprocessor, or the processor may be any conventional processor or the like.

It should be further understood that there may be one or more processors in this application. This may be adjusted based on an actual application scenario, is merely an example for description, and is not limited herein. There may be one or more memories in the embodiments. This may be adjusted based on an actual application scenario, is merely an example for description, and is not limited herein.

It should be further noted that when the data processing apparatus includes a processor (or a processing unit) and a memory, the processor in this application may be integrated with the memory, or may be connected to the memory through an interface. This may be adjusted based on an actual application scenario, and is not limited.

It may be clearly understood by persons skilled in the art that, for the purpose of convenient and brief description, for a detailed working process of the system, apparatus, and unit above, refer to a corresponding process in the foregoing method embodiments, and details are not described herein again.

In the several embodiments provided in this application, it should be understood that the disclosed system, apparatus, and method may be implemented in other manners. For example, the described apparatus embodiments are merely examples. For example, the division into units is merely logical function division and may be other division during implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electrical form, a mechanical form, or another form.

The units described as separate parts may or may not be physically separate, and parts displayed as units may or may not be physical units, may be located in one location, or may be distributed on a plurality of network units. Some or all of the units may be selected based on actual requirements to achieve the objectives of the solutions of the embodiments.

In addition, functional units in the embodiments may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and is sold or used as an independent product, the integrated unit may be stored in a computer-readable storage medium. Based on such an understanding, the technical solutions essentially, or the part contributing to the prior art, or all or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of FIG. 4 to FIG. 14 in this application.

It should be understood that the storage medium or the memory in this application may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), and is used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

It should be noted that the memory described in this specification aims to include but is not limited to these memories and any other appropriate type of memory.

In conclusion, the foregoing embodiments are merely intended for describing but not for limiting the technical solutions. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments.

What is claimed is:

1. A data processing method, comprising:
receiving, by an access network device, a vehicle-to-everything (V2X) communication parameter of a group member device, wherein the V2X communication parameter is received from a policy control function (PCF) entity, and the V2X communication parameter is sent to the access network device by the PCF entity in response to the PCF entity receiving indication information that indicates a connection has been established between the group member device and a group control device; and
storing, by the access network device, the V2X communication parameter with context about a group to which the group member device belongs, wherein the V2X communication parameter is used for allocation of a ProSe communication 5 (PC5) resource to the group member device,
wherein the V2X communication parameter comprises V2X authorization information of the group member device and a PC5 quality of service (QOS) parameter of the group member device.

2. The method according to claim 1, wherein the method further comprises:
allocating, by the access network device, the PC5 resource to the group member device based on the V2X communication parameter; and
sending, by the access network device, information about the PC5 resource to the group control device.

3. The method according to claim 2, wherein the method further comprises:
receiving, by the access network device, a PC5 resource request message from the group control device, wherein the PC5 resource request message requests allocation of the PC5 resource to the group member device; and
allocating, by the access network device, the PC5 resource to the group member device based on the PC5 resource request message and the V2X communication parameter.

4. The method according to claim 3, wherein the allocating, by the access network device, the PC5 resource to the group member device based on the PC5 resource request message and the V2X communication parameter comprises:
performing, by the access network device, authorization check on the group member device based on the V2X communication parameter;
based on a determination that the group member device is successfully authorized, allocating, by the access network device, the PC5 resource to the group member device; and
sending, by the access network device, the information about the PC5 resource to the group control device.

5. The method according to claim 3, wherein the PC5 resource request message comprises at least one of a group member identification number of the group member device, a PC5 quality of service identifier (PQI) of the group member device, a PC5 quality of service (QOS) flow identifier of the group member device, or a data volume of the group member device.

6. A data processing method, comprising:
receiving, by a policy control function (PCF) entity, indication information, wherein the indication information indicates that a connection has been established between a group member device and a group control device;
in response to receiving the indication information, obtaining, by the PCF entity, a vehicle-to-everything (V2X) communication parameter of the group member device; and
sending, by the PCF entity, the V2X communication parameter to an access network device accessed by a group control device in a group to which the group member device belongs,
wherein the V2X communication parameter comprises V2X authorization information of the group member device and a ProSe communication 5 (PC5) quality of service (QOS) parameter of the group member device.

7. The method according to claim 6, wherein the obtaining, by the PCF entity, the V2X communication parameter of the group member device comprises:
obtaining, by the PCF entity, a locally stored V2X communication parameter based on the indication information.

8. The method according to claim 6, wherein the receiving, by the PCF entity, the indication information comprises:
receiving, by the PCF entity, the indication information from an application server (AS).

9. The method according to claim 6, wherein the method further comprises:
performing, by the PCF entity, authorization check on the group member device based on the V2X communication parameter; and
based on a determination that the group member device is successfully authorized, associating, by the PCF entity, the group member device with the group control device.

10. The method according to claim 6, wherein the method further comprises:
receiving, by the PCF entity, a group member identification number of the group member device from the group control device.

11. The method according to claim 10, wherein the method further comprises:
sending, by the PCF entity, the group member identification number to the access network device.

12. The method according to claim 10, wherein after allocating, by the PCF entity, a group member identification number to the group member device, the method further comprises:
sending, by the PCF entity, the group member identification number to the group member device.

13. A data processing method, comprising:
establishing, by a group control device, a connection to a group member device based on a vehicle-to-everything (V2X) communication parameter of the group member device; and
sending, by the group control device, indication information to a policy control function (PCF) entity to cause the PCF entity to send the V2X communication parameter to an access network device accessed by the group control device in a group to which the group member device belongs, wherein the indication information indicates that the connection has been established between the group control device and the group member device,
wherein the V2X communication parameter comprises V2X authorization information of the group member device and a ProSe communication 5 (PC5) quality of service (QOS) parameter of the group member device.

14. The method according to claim 13, wherein the method further comprises:
receiving, by the group control device, a PC5 resource request message from the group member device;
sending, by the group control device, the PC5 resource request message to an access network device;
receiving, by the group control device from the access network device, information about a PC5 resource allocated to the group member device; and
allocating, by the group device, the PC5 resource to the group member device based on the information about the PC5 resource.

15. The method according to claim 13, wherein the method further comprises:
sending, by the group control device, a group member identification number to the group member device.

16. The method according to claim 15, wherein the method further comprises:
allocating, by the group control device, the group member identification number to the group member device.

17. The method according to claim 15, wherein the method further comprises:
receiving, by the group control device, the group member identification number from the PCF entity.

18. The method according to claim 15, wherein the method further comprises:
receiving, by the group control device, the group member identification number from the access network device.

\* \* \* \* \*